United States Patent
Ottamalika et al.

(10) Patent No.: US 11,799,737 B1
(45) Date of Patent: Oct. 24, 2023

(54) TOPOLOGY-BASED GRAPHICAL USER INTERFACE FOR NETWORK MANAGEMENT SYSTEMS

(71) Applicant: Juniper Networks, Inc., Sunnyvale, CA (US)

(72) Inventors: Iqlas M. Ottamalika, Cupertino, CA (US); Wei Gao, Newark, CA (US); Tashi Garg, San Jose, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 17/364,630

(22) Filed: Jun. 30, 2021

(51) Int. Cl.
| | |
|---|---|
| *G06F 15/173* | (2006.01) |
| *H04L 41/22* | (2022.01) |
| *H04L 43/04* | (2022.01) |
| *H04L 41/12* | (2022.01) |
| *H04L 41/14* | (2022.01) |

(52) U.S. Cl.
CPC .............. *H04L 41/22* (2013.01); *H04L 41/12* (2013.01); *H04L 41/145* (2013.01); *H04L 43/04* (2013.01)

(58) Field of Classification Search
CPC ....... H04L 41/22; H04L 41/12; H04L 41/145; H04L 43/04
See application file for complete search history.

(56) References Cited

U.S. PATENT DOCUMENTS

| | | |
|---|---|---|
| 5,671,353 A | 9/1997 | Tian et al. |
| 9,258,195 B1 * | 2/2016 | Pendleton ............... H04L 67/75 |
| 10,200,248 B1 | 2/2019 | Jiang et al. |
| 10,516,761 B1 | 12/2019 | A et al. |
| 11,265,224 B1 | 3/2022 | Bogado et al. |
| 2003/0020764 A1 * | 1/2003 | Germain ................. H04L 43/00 715/853 |

(Continued)

FOREIGN PATENT DOCUMENTS

| | | |
|---|---|---|
| CN | 111930541 A | 11/2020 |
| EP | 3570493 A1 | 11/2019 |
| WO | 2013184846 A1 | 12/2013 |

OTHER PUBLICATIONS

Przygienda et al. "RIFT: Routing in Fat Trees", draft-ietf-rift-rift-01, RIFT Working Group, Internet-Draft, Apr. 26, 2018, 78 pp.

(Continued)

*Primary Examiner* — Padma Mundur
(74) *Attorney, Agent, or Firm* — Shumaker & Sieffert, P.A.

(57) ABSTRACT

In general, techniques are described by which to provide a topology-based graphical user interface for network management systems. A controller device comprising a processor and a memory may be configured to perform the techniques. The processor may monitor network devices arranged according to a network topology to obtain operational data, and obtain configuration data defining the network topology. The memory may store the operational data and the configuration data. The processor may analyze the configuration data and the operational data to provide a graphical representation of the network topology that graphically depicts the operational data, and present a single graphical user interface that presents the graphical representation of the network topology that graphically depicts the operational data.

16 Claims, 14 Drawing Sheets

(56) References Cited

U.S. PATENT DOCUMENTS

| | | | | |
|---|---|---|---|---|
| 2008/0167307 | A1* | 7/2008 | Tozawa | C07D 277/36 |
| | | | | 514/369 |
| 2009/0290513 | A1* | 11/2009 | Swan | H04L 41/0213 |
| | | | | 370/254 |
| 2009/0327903 | A1* | 12/2009 | Smith | H04L 41/12 |
| | | | | 715/737 |
| 2013/0246673 | A1* | 9/2013 | Cox | H04L 41/12 |
| | | | | 710/104 |
| 2014/0201642 | A1* | 7/2014 | Vicat-Blanc | H04L 41/22 |
| | | | | 715/736 |
| 2015/0149611 | A1* | 5/2015 | Lissack | G06F 9/45558 |
| | | | | 709/224 |
| 2016/0294981 | A1* | 10/2016 | Takezawa | H04L 43/045 |
| 2017/0163565 | A1 | 6/2017 | Moran, Jr. | |
| 2017/0220506 | A1 | 8/2017 | Brown et al. | |
| 2017/0237687 | A1 | 8/2017 | Sanders et al. | |
| 2017/0255452 | A1 | 9/2017 | Barnes et al. | |
| 2017/0358111 | A1* | 12/2017 | Madsen | H04L 41/12 |
| 2018/0102934 | A1 | 4/2018 | Ly et al. | |
| 2018/0351819 | A1 | 12/2018 | Mohanram et al. | |
| 2018/0367412 | A1 | 12/2018 | Sethi et al. | |
| 2019/0356551 | A1* | 11/2019 | Lekshmanan | H04L 41/22 |
| 2020/0082056 | A1 | 3/2020 | Hasegawa | |
| 2020/0267054 | A1 | 8/2020 | Thampy et al. | |
| 2020/0366752 | A1* | 11/2020 | White | G06F 11/3409 |
| 2021/0075689 | A1 | 3/2021 | Ramanathan et al. | |
| 2021/0232485 | A1* | 7/2021 | Agarwal | G06F 11/3419 |
| 2021/0409277 | A1 | 12/2021 | Jeuk et al. | |
| 2022/0173979 | A1 | 6/2022 | Wickes et al. | |

OTHER PUBLICATIONS

"Implementing Remote Procedure Calls with gRPC and Protocol Buffers" DigitalOcean, LLC, Nov. 12, 2020, available at https://scotch.io/tutorials/implementing-remote-procedure-calls-with-grpc-and-protocol-buffers (last accessed Sep. 3, 2021), 22 pp.

Tuch "Dynamic extensibility andProtocol Buffers" Envoy Proxy, Nov. 30, 2017, 6 pp.

"Dynamic_message.h" Protocol Buffers, Google Developers, Google, Inc. Nov. 1, 2019, 2 pp.

Baeldung "Spring REST API with Protocol Buffers" Baeldung.com, Feb. 12, 2020, 10 pp.

Bjorklund, "Yang—A Data Modeling Language for the Network Configuration Protocol (NETCONF)," Internet Engineering Task Force (IETF), RFC 6020, Oct. 2010, 173 pp.

Harrington et al., "An Architecture for Describing Simple Network Management Protocol (SNMP) Management Frameworks," Network Working Group, RFC 3411, Dec. 2002, 64 pp.

Enns, "NETCONF Configuration Protocol," Network Working Group, RFC 4741, Dec. 2006, 95 pp.

U.S. Appl. No. 17/364,637, filed Jun. 30, 2021, naming inventors Ottamalika et al.

U.S. Appl. No. 17/446,923, filed Sep. 3, 2021, naming inventors Henkel et al.

Extended Search Report from counterpart European Application No. 21200247.1 dated Mar. 14, 2022, 10 pp.

Response to Extended Search Report dated Mar. 14, 2022, from counterpart European Application No. 21200247.1 filed Jul. 4, 2023, 28 pp.

* cited by examiner

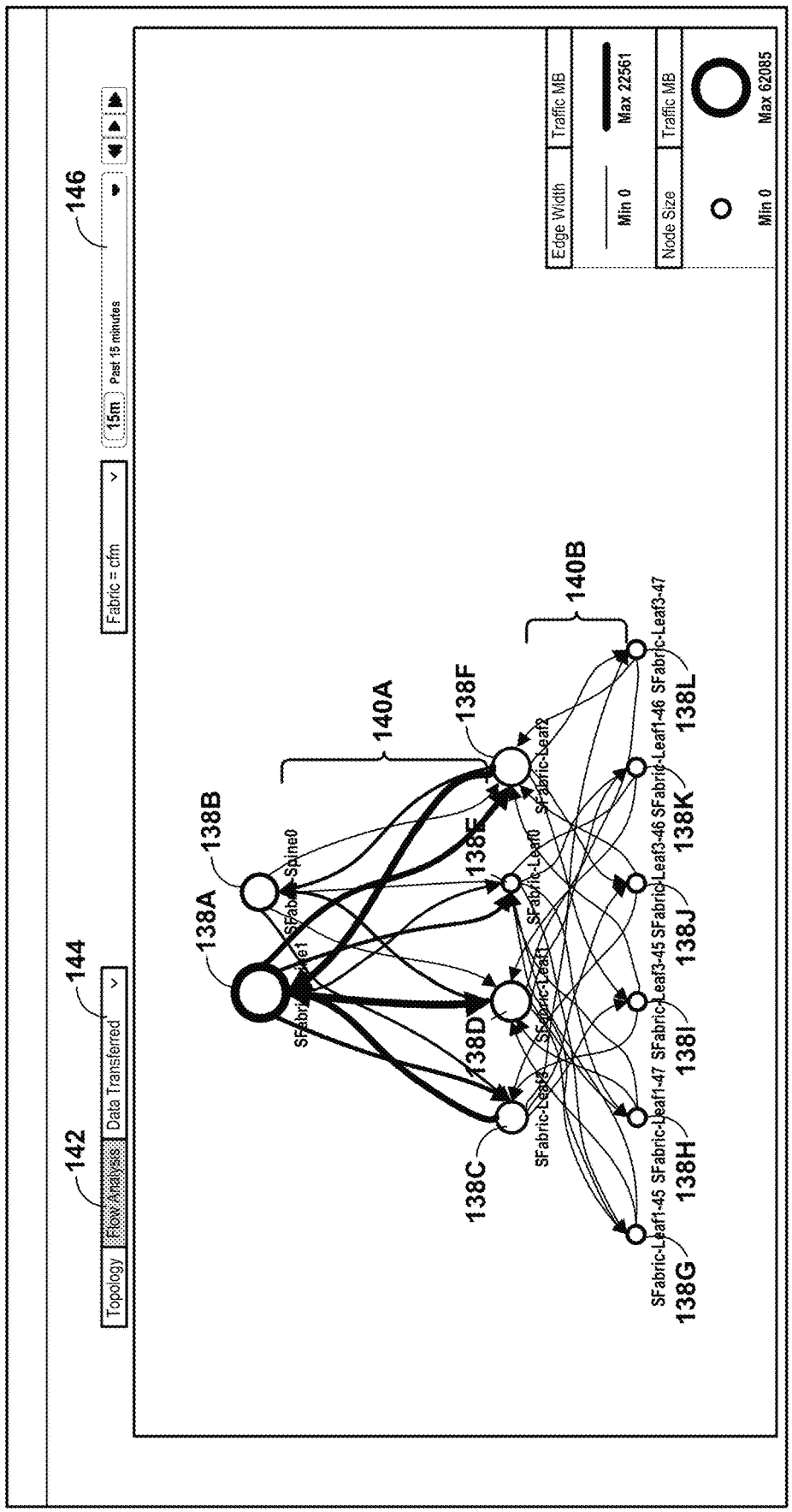

TOPOLOGY-BASED GRAPHICAL USER INTERFACE FOR NETWORK MANAGEMENT SYSTEMS

TECHNICAL FIELD

This disclosure relates to computer networks, and more specifically, to use of a network management controller in computer networks.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

Network devices typically include mechanisms, such as management interfaces, enabling local or remote configuration. By interacting with the management interface, a client device can perform configuration tasks as well as perform operational commands to collect and view operational data of the managed devices. For example, client devices may configure interface cards of the managed device, adjust parameters for supported network protocols, specify physical components within the managed device, modify routing information maintained by a router, access software modules and other resources residing on the managed device, and perform other configuration tasks. In addition, client devices may allow a user to view current operating parameters, system logs, information related to network connectivity, network activity or other status information (including alerts and other warnings) from the devices as well as view and react to event information received from the devices.

In some instances, a network administrator may deploy a network controller (which may also be referred to as a "controller" or "controller device") to interface with the underlying managed devices via the management interface in order to configure and/or monitor the managed devices. However, due to the large amount of information provided to the network controller, it can often be difficult to fully understand how the network is operating and the impact of certain operating parameters, status information, or other operational data, on the overall operation of the network.

SUMMARY

In general, this disclosure describes techniques for a topology-based graphical user interface that facilitates better understanding of how the managed devices are operating in support of intents. A network management system (NMS) device, also referred herein as a controller or controller device, may be configured to translate high-level configuration (intents received from an administrator for a plurality of managed network devices) to low-level configuration (to be applied to the managed network devices themselves). In some instances, the controller device may receive an indication of a topology and a role for a resource device (which is another way of referring to managed devices) and generate device-level configuration information for the resource device.

For example, an administrator (e.g., a human being) may select a topology (e.g., spine or leaf, 3-stage Clos, or 5-stage Clos) and role for the resource device and provide an intent. In some examples, the controller device may generate device-level configuration for the managed device based on the role of the resource device, the topology, and the intent. Once configured, the controller device may monitor the operation of the topology, gathering various operational data in real-time or near real-time to facilitate review of the operation of the topology by an administrator or other network operator. Rather than present this information in a table that may span a large number (e.g., 100s if not 1000s of rows having multiple columns), the controller device may present a topology-based graphical user interface that graphically depicts various operating conditions of the topology in accordance with various aspects of the techniques described in this disclosure.

In some instances, the controller device may present a single graphical user interface that enables cross-correlation between different types of operational data, such as network flow data, device health data, interface data, and alert data. Moreover, the single graphical user interface may enable natural language processing for defining a time range over which operational data is aggregated prior to presentation via the single graphical user interface, identification of source and destinations, and identification of one or more of the type of operational data (e.g., flow, device health, interface, and/or alert). Further, the single graphical user interface may enable interactions with the network topology to reveal or otherwise present additional data, such as interfaces that support given flows within the network topology.

In this way, various aspects of the techniques may improve administrator review of topologies via a unified graphical user interface that results in potentially less user interactions with the controller device while also possibly promoting more comprehensive oversight of network topologies. The unified graphical user interface may enable better troubleshooting and faster understanding of network topology operation that may further reduce interactions with the network controller. As less interactions may occur, the network controller may avoid unnecessary interactions that would otherwise consume various resources (such as processor cycles, memory, and/or memory bus bandwidth as well as associated power). As a result, various aspects of the techniques may improve operation of the network controller itself.

In addition, this disclosure describes various aspects of the techniques that enable review of network topologies through segmentation when presented via graphical user interfaces. Rather than present entire network topologies for review, where such network topologies may include 10s, 100s, or more network devices, a controller device may enable (physical or logical) segmentation of network topologies that allow for only a portion of a given network topology to be graphically represented via a graphical user interface in accordance with various aspects of the techniques described herein.

The controller device may enable a network administrator or other user to tag or group various network devices configured to provide a network topology (e.g., a fabric) such that only network devices assigned the same tag and/or group (or a collection of tags and/or groups) to be graphically represented. The controller device may, as one example, segment the entire network topology using the tag and/or group so as to more easily present various segments of the entire network. Moreover, the controller device may output a graphical user interface with which the administrator may interface to provide input that graphically segments the entire network topology, which the graphical user interface may present (responsive to receiving the input) in more detail to facilitate further review.

Furthermore, the controller device may be configured to implement various aspects of the techniques to generate graphical user interfaces that enable review of aggregate device health data that presents a relative health as such health relates to each of the network device in terms of an assigned role in support of the overall network topology. For example, when less important roles experience operational conditions that do not greatly impact operation of the overall network topology (e.g., due to redundancies of the particular role in the network topology), failure of the network device may not result in a low health rating (as represented by the device health data), whereas network devices that have more important roles in support of the overall network topology (e.g., due to less redundancy of the particular role in the network topology) that experience various operational conditions may receive a low health rating. The controller device may graphically present the device health data via the generated graphical user interface to enable administrators to potentially better understand and troubleshoot network topologies.

In this way, various aspects of the techniques may improve administrator review of topologies via graphical user interfaces that result in potentially less user interactions with the controller device while also possibly promoting more comprehensive oversight of network topologies. The graphical user interface may enable better troubleshooting and faster understanding of network topology operation that may further reduce interactions with the network controller while also allowing network administrators to focus on issues in the network topologies of higher relative importance. As the administrator may more effectively address network issues, the network controller may better address network topologies and enable such network topologies to operate more efficient, thereby consuming less resources (such as processor cycles, memory, and/or memory bus bandwidth as well as associated power). As a result, various aspects of the techniques may improve operation of the network topology itself, while also potentially improving interactions with administrators that allow the controller device itself to operate more efficiently (again in terms of resource consumption).

In one example, various aspects of the techniques described in this disclosure are directed to a method comprising: monitoring, by a controller device, network devices arranged according to a network topology to obtain operational data; obtaining, by the controller device, configuration data defining the network topology; analyzing, by the controller device, configuration data and operational data to generate a graphical representation of the network topology that graphically depicts the operational data; and presenting, by the controller device, a single graphical user interface that includes the graphical representation of the network topology that graphically depicts the operational data.

In another example, various aspects of the techniques described in this disclosure are directed to a controller device comprising: one or more processors configured to: monitor network devices arranged according to a network topology to obtain operational data; and obtain configuration data defining the network topology; and a memory configured to store the operational data and the configuration data, wherein the one or more processors are further configured to: analyze the configuration data and the operational data to provide a graphical representation of the network topology that graphically depicts the operational data; and present a single graphical user interface that presents the graphical representation of the network topology that graphically depicts the operational data.

In another example, various aspects of the techniques described in this disclosure are directed to a non-transitory computer-readable storage medium having instructions stored thereon that, when executed, cause one or more processors of a controller device to: monitor network devices arranged according to a network topology to obtain operational data; obtain configuration data defining the network topology; analyze configuration data and operational data to provide a graphical representation of the network topology that graphically depicts the operational data; and present a single graphical user interface that presents the graphical representation of the network topology that graphically depicts the operational data.

In another example, various aspects of the techniques described in this disclosure are directed to a method comprising: obtain, by a controller device, configuration data for configuring network devices to provide a network topology; segmenting, by the controller device and based on the configuration data, the network topology to obtain a segmented network topology that represents a portion of the network topology; generating, by the controller device, a first graphical user interface that presents a graphical representation of the segmented network topology; and outputting, by the controller device, the first graphical user interface.

In another example, various aspects of the techniques described in this disclosure are directed to a controller device comprising: a memory configured to store configuration data for configuring network devices to provide a network topology; and one or more processors configured to: segment, based on the configuration data, the network topology to obtain a segmented network topology that represents a portion of the network topology; generate a first graphical user interface that presents a graphical representation of the segmented network topology; and output the first graphical user interface.

In another example, various aspects of the techniques described in this disclosure are directed to a non-transitory computer-readable storage medium having instructions stored thereon that, when executed, cause one or more processors of a controller device to: obtain configuration data for configuring network devices to provide a network topology; segment, based on the configuration data, the network topology to obtain a segmented network topology that represents a portion of the network topology; generate a first graphical user interface that presents a graphical representation of the segmented network topology; and output the first graphical user interface.

The details of one or more examples are set forth in the accompanying drawings and the description below. Other features, objects, and advantages will be apparent from the description and drawings, and from the claims.

BRIEF DESCRIPTION OF DRAWINGS

FIGS. 3A-3F are diagrams illustrating examples of the single graphical user interface that provides a topology-based view of a network in accordance with various aspects of the techniques described in this disclosure.

DETAILED DESCRIPTION

Figure 1:
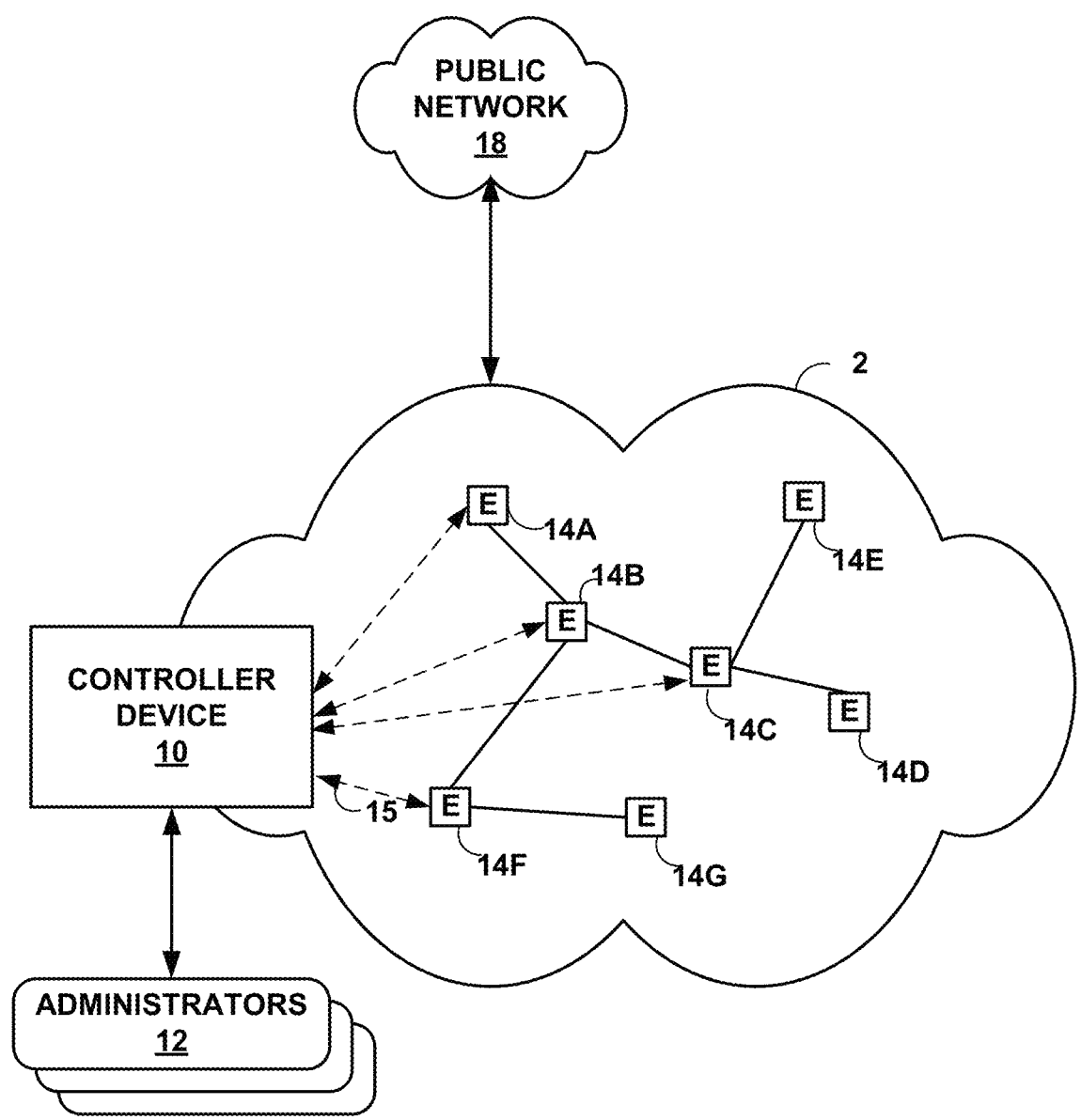
FIG. 1 is a block diagram illustrating an example including elements of an enterprise network that are managed using a management device.

FIG. 1 is a block diagram illustrating an example including elements of an enterprise network 2 that are managed using a controller device 10. Managed elements 14A-14G (collectively, "elements 14") of enterprise network 2 include network devices interconnected via communication links to form a communication topology in order to exchange resources and information. Elements 14 (also generally referred to as network devices, remote network devices, managed network devices, and/or managed devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Controller device 10 is communicatively coupled to elements 14 via enterprise network 2. Controller device 10, in some examples, forms part of a device management system, although only one device of the device management system is illustrated for purpose of example in FIG. 1. Controller device 10 may be coupled either directly or indirectly to the various elements 14. Once elements 14 are deployed and activated, administrator 12 uses controller device 10 to manage the network devices using a device management protocol.

One example device protocol is the Simple Network Management Protocol (SNMP) that allows controller device 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

Controller device 10, also referred to as a network management system (NMS) or NMS device, and elements 14 are centrally maintained by an IT group of the enterprise. Administrator 12 interacts with controller device 10 to remotely monitor and configure elements 14. For example, administrator 12 may receive alerts from controller device 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrator 12 uses controller device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 14, e.g., element 14F, using controller device 10, to directly configure element 14F. In this manner, a user can provide commands in a format for execution directly to elements 14.

Further, administrator 12 can also create scripts that can be submitted by controller device 10 to any or all of elements 14. For example, in addition to a CLI interface, elements 14 also provide interfaces for receiving scripts that specify the commands in accordance with a scripting language. In a sense, the scripts may be output by controller device 10 to automatically invoke corresponding remote procedure calls (RPCs) on the managed elements 14. The scripts may conform to, e.g., extensible markup language (XML) or another data description language.

Administrator 12 uses controller device 10 to configure elements 14 to specify certain operational characteristics that further the objectives of administrator 12. For example, administrator 12 may specify for an element 14 a particular operational policy regarding security, device accessibility, traffic engineering, quality of service (QoS), network address translation (NAT), packet filtering, packet forwarding, rate limiting, or other policies. Controller device 10 uses one or more network management protocols designed for management of configuration data within managed network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741, the entire contents of which are incorporated herein by reference. Controller device 10 may establish NETCONF sessions with one or more of elements 14.

Controller device 10 may be configured to accept high-level configuration data, or intents, from administrator 12 (which may be expressed as structured input parameters, e.g., according to YANG, which is described in Bjorklund, "YANG—A Data Modeling Language for the Network Configuration Protocol (NETCONF)," Internet Engineering Task Force, RFC 6020, October 2010, available at tools.ietf.org/html/rfc6020). Controller device 10 may also be configured to output respective sets of low-level device configuration data, e.g., device configuration additions, modifications, and removals. Additional details regarding an example process for translating high level configuration information to low-level device configuration information can be found in, e.g., Jiang et al., "TRANSLATING HIGH-LEVEL CONFIGURATION INSTRUCTIONS TO LOW-LEVEL DEVICE CONFIGURATION," U.S. patent application Ser. No. 15/198,657, filed Jun. 30, 2016, the entire contents of which are hereby incorporated by reference.

This disclosure refers to low-level device configuration produced from intents (i.e., produced by compiling or translating the intents) as "device-level intent configuration information" or "intent configuration," to distinguish this device-level configuration from out of band (OOB) device-level configuration. In some examples, controller device 10 may use YANG modeling for an intent data model and low-level device configuration models. This data may contain relations across YANG entities, such as list items and containers. In some examples, controller device 10 may convert a YANG data model into a database model, and convert YANG validations into data validations. Techniques for managing network devices using a graph model for high level configuration data is described in "CONFIGURING AND MANAGING NETWORK DEVICES USING PROGRAM OVERLAY ON YANG-BASED GRAPH DATABASE," U.S. patent application Ser. No. 15/462,465, filed Mar. 17, 2017, the entire contents of which are hereby incorporated by reference.

Controller device 10 may receive data from one of administrators 12 representing any or all of create, read, update, and/or delete (CRUD) actions with respect to the intent data model. Controller device 10 may be configured to use the same compilation logic for each of create, read, update, and delete as applied to the graph model.

In general, controllers like controller device 10 may use a hierarchical data model for intents, low-level data models, and resources. The hierarchical data model can be based on YANG or YAML. The hierarchical data model can be represented as a graph, as discussed above. Use of intents may ease the management of networks. Intents are declarative. To realize intents, controller device 10 attempts to select optimal resources.

In general, controller device 10 may be configured to translate high-level configuration (e.g., intents received from an administrator for a plurality of managed network devices) to low-level configuration, which may also be referred to herein as "device-level configuration" (to be applied to the managed network devices themselves). In some instances, controller device 10 may receive an indication of a topology and a role for element 14A and generate device-level configuration information for element 14A. For example, administrator 12 may select a topology and role for element 14A and provide an intent. In some examples, controller device 10 may generate device-level configuration for element 14A based on the role (e.g., spine or leaf) of element 14A in the topology (e.g., a spine and leaf topology), the topology, and the intent.

For example, administrator 12 may select a topology (e.g., spine or leaf, 3-stage Clos, or 5-stage Clos) and role for element 14A and provide an intent. In some examples, controller device 10 may generate device-level configuration for the managed device based on the role of element 14A, the topology, and the intent. Once configured, controller device 10 may monitor the operation of the topology, gathering various operational data in real-time or near real-time to facilitate review and troubleshooting of the operation of the topology by administrator 12 or other network operators.

While controller device 10 may facilitate review and troubleshooting, user interfaces used to facilitate such review may present a segmented view of such operational data that divides different types of operational data across a number of different interfaces. Further, given the large amount of operational data presented with respect to some topologies (e.g., large fabrics that may involve 10's, if not 100's, of different devices), each user interface may present large tables of data for review by administrators, resulting in administrators potentially struggling to identify issues that degrade operation of the topology. Such troubleshooting may become time intensive and thereby possibly result in prolonged inefficient operation of the topology.

According to various aspects of the techniques described in this this disclosure, controller device 10 may present a topology-based graphical user interface that facilitates better understanding of how elements 14 are operating in support of intents. Rather than present this information in a table that may span a large number (e.g., 100s if not 1000s of rows having multiple columns), controller device 10 may present the topology-based graphical user interface that graphically depicts various operating conditions of the topology in accordance with various aspects of the techniques described in this disclosure.

Controller device 10 may present a single graphical user interface that enables cross-correlation between different types of operational data, such as network flow data, device health data, interface data, and/or alert data. Moreover, the single graphical user interface may enable natural language processing for defining a time range over which operational data is aggregated prior to presentation via the single graphical user interface, identification of source and destinations, and identification of one or more of the type of operational data (e.g., flow, device health, interface, and/or alert). Further, the single graphical user interface may enable interactions with the topology to reveal or otherwise present additional data, such as interfaces that support given flows within the topology.

In operation, controller device 10 may monitor elements 14 (which may also be referred to, as noted above, as managed devices 14 or network devices 14) arranged according to a topology in order to obtain operational data, such as the above noted network flow data, device health data, interface data, and/or alert data. In the example of FIG. 1, it is assumed that elements 14 reside in a data center and operate to form a fabric topology (referred to as a "fabric") by which packets or other data units are routed/switched to provide services to one or more end users coupled to the data center, e.g., via public network 18, where such services may include payment processing, content hosting, voice over Internet protocol (IP) or VoIP, videoconferencing, webconferencing, etc. As such, enterprise network 2 may also be referred to as fabric 2.

Network flow data may refer to an amount of traffic transferred for a particular network flow (which are unidirectional and define data transmitted to a given so-called five-tuple defined by a source Internet protocol— IP— address, a destination IP address, a source port, a destination port, and a protocol such as, e.g., IP or transmission control protocol—TCP). Device health data may refer to an operational status of one or more of elements 14, where controller device 10 may aggregate a number of different aspects of elements 14, such as interface operation, packets dropped, current operational status of elements 14, etc. to provide a device health for each of elements 14. Interface data may refer to data indicative of how each individual interface of elements 14 is operating, while alert data may represent alerts and/or warning raised by elements 14 due to misconfiguration, inactive status, memory failure, memory utilization, processor utilization, etc.

In any event, controller device 10 may interface with each of elements 14 via the management interfaces presented by elements 14. Controller device 10 may, in some instances, establish a push framework in which elements 14 push or otherwise provide operational data periodically or in response to some event thereafter without requiring controller device 10 to interface with elements 14 each time operational data becomes available. In other instances or in conjunction with such push instances, controller device 10 may establish a pull framework in which controller device 10 interfaces, possibly periodically or responsive to some event, with each of elements 14 to request operational data each time controller device 10 requires such operational data. Regardless of the framework, controller device 10 may obtain operational data from each of elements 14, storing such operational data to a database or other data store.

Controller device 10 may next obtain configuration data defining fabric 14 (or in other words, the network topology). Controller device 10 may store configuration data locally to a database or other data store or may retrieve such configuration data from elements 14 or from a remote database or other data store. Assuming for purposes of example that configuration data is stored locally, controller device 10 may interface with a configuration database to retrieve the configuration data defining the configuration of elements 14 in support of fabric 2. Although assumed to support a single topology, e.g., fabric 2, one or more, including subsets of, elements 14 may support multiple different topologies in support of the various services offered by the data center across various different end users and/or customers.

Controller device 10 may next apply various algorithms to analyze configuration data and operational data to generate a graphical representation of the network topology that graphically depicts the operational data. For example, controller device 10 may arrange elements 14 as nodes in a graph data structure with edges of the graph data structure defining connections (e.g., physical links) between elements 14, where elements 14 and the connections are defined by the configuration data. Controller device 10 may generate a graphical representation of the graph data structure (as discussed in more detail below), assigning different formats to the graphical representation of the nodes and edges of the graph data structure based on the operational data.

Controller device 10 may then generate a single graphical user interface that includes the graphical representation of fabric 2 (e.g., the graph data structure) that graphically depicts the operational data. Controller device 10 may then present the single graphical user interface to administrators 12, which may interact with the single graphical user interface in a number of different way to potentially better understand operation of fabric 2 and thereby perform troubleshooting in a more unified way without having to perform frequent interactions with multiple user interfaces that would otherwise be required to see the multiple different types of operational data.

In this way, various aspects of the techniques may improve review of topologies, such as fabric 2, by administrators 12 via a unified graphical user interface that results in potentially less user interactions with controller device 10 while also possibly promoting more comprehensive oversight of network topologies. The unified graphical user interface may enable better troubleshooting and faster understanding of network topology operation that may further reduce interactions with network controller 10. As less interactions may occur, network controller 10 may avoid unnecessary interactions that would otherwise consume various resources (such as processor cycles, memory, and/or memory bus bandwidth as well as associated power). As a result, various aspects of the techniques may improve operation of network controller 10 itself.

In addition, this disclosure describes various aspects of the techniques that enable review of network topologies through segmentation when presented via graphical user interfaces. Rather than present entire network topologies for review, where such network topologies may include 10s, 100s, or more network devices, controller device 10 may enable (physical or logical) segmentation of network topologies that allow for only a portion of a given network topology to be graphically represented via a graphical user interface in accordance with various aspects of the techniques described herein.

Controller device 10 may enable a network administrator or other user to tag or group various elements 14 configured to provide a network topology (e.g., fabric 2) such that only elements 14 assigned the same tag and/or group (or a collection of tags and/or groups) to be graphically represented. Controller device 10 may, as one example, segment fabric 2 using the tag and/or group so as to more easily present various segments of entire fabric 2. Moreover, controller device 10 may output a graphical user interface with which administrator 12 may interface to provide input that graphically segments fabric 2, which the graphical user interface may present (responsive to receiving the input) in more detail to facilitate further review.

Furthermore, controller device 10 may be configured to implement various aspects of the techniques to generate graphical user interfaces that enable review of aggregate device health data that presents a relative health as such health relates to each of elements 14 in terms of an assigned role in support of fabric 2. For example, when less important roles experience operational conditions that do not greatly impact operation of fabric 2 (e.g., due to redundancies of the particular role in fabric 2), failure of any one of elements 2 in that role may not result in a low health rating (as represented by the device health data), whereas elements 14 that have more important roles in support of fabric 2 (e.g., due to less redundancy of the particular role in fabric 2) that experience various operational conditions may be assigned a low health rating. Controller device 10 may graphically present the device health data via the generated graphical user interface to enable administrator 12 to potentially better understand and troubleshoot fabric 2.

In operation, controller device 10 may obtain configuration data for configuring elements 2 to provide fabric 2. As noted above, controller 10 may obtain such configuration from local or remote data stores, such as databases, as well as from elements 2. Controller device 10 may then segment, based on the configuration data (which may include the above noted tags and/or groups), fabric 2 to obtain a segmented fabric that represents a portion of fabric 2 (where such portion should be understood to be less then the entirety of fabric 2 in terms of having at least one of elements 14 of fabric 2 excluded from the segmented fabric). Controller device 10 may then generate a first graphical user interface that presents a graphical representation of the segmented fabric, and output the first graphical user interface.

In addition, controller device 10 may, as noted above, monitor elements 14 configured to provide fabric 2 to obtain operational data, which may include interface metrics, fan temperature, memory usage, protocols, and disk usage. Controller device 10 may analyze the configuration data and the operational data to generate the device health data for each of the network devices at two or more levels of granularity (e.g., a fabric level and a device level). Controller device 10 may generate the device health data to identify a relative health of each of elements 14 with respect to each role assigned to elements 14 in fabric 2. Controller device 10 may next generate a graphical user interface (or update the existing graphical user interface) to present the device health data, outputting the graphical user interface for review by administrator 12.

In this way, various aspects of the techniques may improve administrator review of fabric 2 via graphical user interfaces that result in potentially less user interactions with controller device 10 (as the device health data may summarize the state of each element 14 in fabric 2 allowing administrator 12 to identify device/fabric level issues without reviewing multiple different user interfaces) while also possibly promoting more comprehensive oversight of fabric 2. The graphical user interface may enable better troubleshooting and faster understanding of the operation of fabric 2 that may further reduce interactions with network controller 10 while also allowing administrator 12 to focus on issues in fabric 2 of higher relative importance. As administrator 12 may more effectively address network issues, controller device 10 may better address fabric 2 and enable fabric 2 to operate more efficient, thereby consuming less resources (such as processor cycles, memory, and/or memory bus bandwidth as well as associated power). As a result, various aspects of the techniques may improve operation of the network topology itself, while also potentially improving interactions with administrator 12 that allow controller device 10 itself to operate more efficiently (again in terms of resource consumption).

Figure 2:
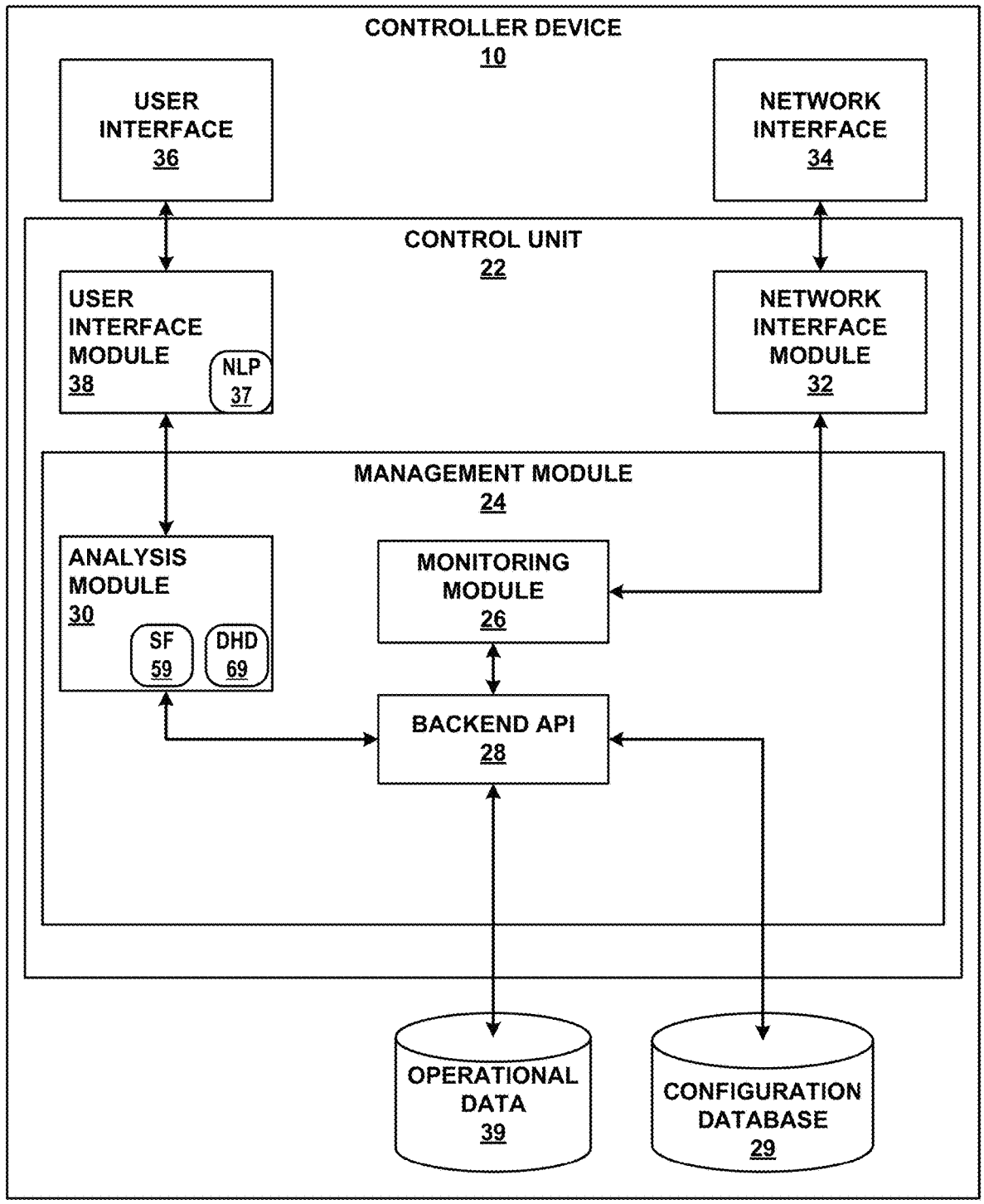
FIG. 2 is a block diagram illustrating an example set of components for the management device of FIG. 1.

FIG. 2 is a block diagram illustrating an example set of components for controller device 10 of FIG. 1. In this example, controller device 10 includes control unit 22, network interface 34, and user interface 36. Network interface 34 represents an example interface that can communicatively couple controller device 10 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Controller device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrator 12 (FIG. 1) interacts with controller device 10, e.g., to provide input and receive output. For example, user interface 36 may represent one or more of a monitor, keyboard, mouse, touchscreen, touchpad, trackpad, speakers, camera, microphone, or the like. Furthermore, although in this example controller device 10 includes a user interface, it should be understood that administrator 12 need not directly interact with controller device 10, but instead may access controller device 10 remotely, e.g., via network interface 34.

In this example, control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in software or firmware, or a combination thereof.

Control unit 22 executes management module 24 to manage various network devices, e.g., elements 14 of FIG. 1. Management includes, for example, configuring the network devices according to instructions received from a user (e.g., administrator 12 of FIG. 1) and providing the user with the ability to submit instructions to configure the network devices. Although not shown in the example of FIG. 2, management module 24 may include a configuration module and a translation module.

Management module 24 is configured to receive intents (e.g., high-level configuration instructions) for a set of managed network devices from a user, such as administrator 12. In some examples, management module 24 may be referred to herein as a "fabric manager." Over time, the user may update the configuration instructions, e.g., to add new services, remove existing services, or modify existing services performed by the managed devices. The intents may be structured according to, e.g., YANG. In some examples, management module 24 also provides the user with the ability to submit translation functions that the translation module executes to transform intents to device-specific, low-level configuration instructions.

Controller device 10 also includes configuration database 40. Configuration database 40 generally includes information describing managed network devices, e.g., elements 14. For example, configuration database 29 may include information indicating device identifiers (such as MAC and/or IP addresses), device type, device vendor, devices species (e.g., router, switch, bridge, hub, etc.), or the like. Configuration database 29 also stores device-level configuration information based on intents (e.g., high-level configuration information, or in some cases, both high-level configuration and low-level configuration information) for the managed devices (e.g., elements 14).

The translation module, which may also be referred to herein as a "device manager," may determine which devices are managed using configuration database 29. The translation module determines which of translation functions to execute on the high-level configuration instructions based on the information of configuration database 29, e.g., which of the devices are to receive the low-level configuration instructions. The translation module then executes each of the determined translation functions of the translation functions, providing the high-level configuration instructions to the translation functions as input and receiving low-level configuration instructions. The translation module may then provide the low-level configuration instructions to the configuration module.

After receiving the low-level configuration instructions from the translation module, the configuration module sends the low-level configuration instructions to respective managed network devices for which configuration is to be updated via network interface module 32. Network interface module 32 passes the low-level configuration instructions to network interface 34. Network interface 34 forwards the low-level configuration instructions to the respective network devices.

Although user interface 36 is described for purposes of example as allowing administrator 12 (FIG. 1) to interact with controller device 10, it should be understood that other interfaces may be used in other examples. For example, controller device 10 may include a representational state transfer (REST) client (not shown) that may act as an interface to another device, by which administrator 12 may configure controller device 10. Likewise, administrator 12 may configure elements 14 by interacting with controller device 10 through the REST client.

As further shown in the example of FIG. 2, management module 24 may include a monitoring module 26, a backend application programming interface (API) 28, and an analysis module 30. Monitoring module 26 may represent a module configured to interface, via network interface module 32 and network interface 34, with elements 14 to obtain operational data 39. Monitoring module 26 may implement the above noted push framework and/or pull framework by which to obtain operational data 39. Monitoring module 26 may then invoke backend API 26 to store operational data 39 to a database or data store either locally (as shown in the example of FIG. 2) or remotely.

Backend API 26 represents an API configured to interface with the database storing operational data 39 and configuration database 29. Backend API 26 may perform various operations to facilitate storage of operational data 39 and configuration data, such as one or more of formatting (or reformatting, including relabeling), transformations, aggregation, timestamping, etc. to store operational data 39 and configuration data to a uniform format or data schema consistent with the underlying databases. Backend API 26 may also form semantically correct database requests that conform to a database query language (such as a structured query language— SQL or any other formal database language).

Analysis module 30 may represent a module configured to support generation of user interface 36 by user interface module 38. That is, analysis module 30 may receive requests for configuration data 29A (which may denote a subset of data stored to configuration database 29) and operational data 39 or some subset thereof (which may be denoted as operational data 39A), where the term subset should be understood to refer to one or more items of, but less than, all items of data and not the strict mathematical definition of subset that includes a zero item subset (a so-called empty subset) up to all items of data.

In any event, analysis module 30 may implement various algorithms, as described in more detail below, to aggregate relevant operational data 39A, analyze operational data 39A to identify various types of operational data 39A, interpret operational data 39A to identify device health and other aspects of elements 14, parse operational data 39A in preparation of unified presentation via user interface 36. Analysis module 30 may reduce dimensionality of operational data 39A and/or derive implicit aspects of operational data 39A, possibly increasing the dimensionality of operation data 39A. In this respect, analysis module 30 may modify operational data 39A to produce operational data 39A' that was translated, edited, formatted, or otherwise modified to facilitate generation of user interface 36. In this way, analysis module 30 may analyze configuration data 29A and operational data 39A to facilitate generation of the graphical representation of fabric 2 (or some other network topology) that graphically depicts operational data 39A'.

Initially, administrator 12 may interact with user interface 36 to select a topology, such as fabric 2, possibly specifying a subset of operational data 39 relevant to a particular issue or state, such as a timeframe over which operational data 39 should be obtained, a source (e.g., a source IP address), a destination (e.g., a destination IP address), and/or a type of operational data (e.g., network flow data, device health data, interface data, and/or alert data). User interface 36 may pass data representative of the interactions (e.g., possibly by way of a function call presented via an API represented by user interface module 38). User interface module 38 may process the data representative of the interactions (which may be referred to as interactions) to resolve an intent of administrator 12 in order to enable analysis module 30 to interface, via backend API 28, with operational database 39 and configuration database 29 to generate a single graphical user interface consistent with various aspects of the techniques described in this disclosure.

As further shown in the example of FIG. 2, user interface module 38 includes a natural language processor (NPL) 37 that facilitate natural language processing of interactions with user interface 36 by administrator 12. NPL 36 may represent a deep neural network capable of processing natural language to derive the intents of administrator 12 expressed as natural language (e.g., text and/or speech entered using plain language as opposed to semantically correct commands that conform to a formal query language, such as SQL). NPL 37 may process the plain language interactions to resolve intents enabling, as one example, one or more of selection of the time range over which operational data 39A' is aggregated prior to the analysis, identification of operation data 39A' by source or destination, and identification of the type of operational data 39A' and then resolve the intent from these interactions using plain language. User interface module 38 may invoke analysis module 30, passing the resolved intent to analysis module 30.

Analysis module 30 may receive the intent and retrieve configuration data 29A and operational data 39A that satisfies the intent. Analysis module 30 may process operational data 39A (which monitoring module 26 may be updating in real-time or near-real-time in the manner described above) to generate operational data 39A'. Analysis module 30 may perform such analysis of configuration data 29A and operational data 39A' to generate a graphical representation of fabric 2 that graphically depicts operational data 39A'. Analysis module 30 passes this graphical representation of fabric 2 to user interface module 38, which generates a single graphical user interface (e.g., user interface 36) that includes the graphical representation of the fabric 2 that graphically depicts operational data 39A'. The single graphical user interface represented by user interface 36 is described in more detail with respect to the examples of FIGS. 3A-3F.

In addition, analysis module 30 may be invoked to segment, based on configuration data 29, fabric 2 to obtain segmented fabric (SF) 59 that includes only a portion of fabric 2. User interface 26 may receive, from administrator 12, an input that indicates segmentation of a graphical representation of fabric 2. In some instances, the input may include a select group or tag. In other instances, the input may graphically denote a segment of the graphical representation of fabric 2 (e.g., such as an input representative of a bounding box or other geometry around the segment of the graphical representation of fabric 2, an input representative of individual selection of a graphical representation of one or more elements 14 that provide fabric 2, etc.). User interface 36 may provide the input to user interface module 38, which may invoke analysis module 30 passing the input to analysis module 30. Based on the input, analysis module 30 may segment fabric 2 into segmented fabric 59, while also adapting operational data 39A and/or 39A' to facilitate a graphical representation of segmented fabric 59 that also graphically represents the adapted operational data.

In any event, analysis module 30 may also analyze operational data 39A to generate device health data (DHD) 69. User interface module 38 may receive an input (via user interface 36) to enable display of granular device health data and invoke analysis module 30 to generate device health data 69 from operational data 39. Analysis module 30 may analyze both operational data 39A and configuration data 29A to generate relative device health data 69 that represents a relative health of elements 14 with respect to each role assigned to elements 14 in fabric 2. Analysis module 30 may perform such analysis using a trained machine learning model that has been trained to generate device health data 69. The trained machine learning model may include a neural network, a convolutional neural network, a decision trees, support vector machines, Bayesian networks, or any other machine learning model and/or artificial neural network. Analysis module 30 may generate device health data 69 for fabric 2 and/or segmented fabric 59. Analysis module 30 may provide device health data 69 to user interface module 38.

User interface module 38 may generate user interface 36 to present device health data 69 for at least one of the two or more levels of granularity. User interface module 38 may output user interface 36 for review by administrator 12. More information regarding user interface 36 that facilitates segmentation and/or display of device health data 69 is described below with respect to FIGS. 4A-5C.

While described as providing local interactions with user interface 36, administrator 12 may interface with user interface 36 remotely, where user interface 36 may be provided to the remote computing device with which administrator 12 is interfacing to interact with user interface 36. In this context, various aspects of the techniques described with respect to user interface 36 may occur locally at the remote computing device passed via a network or other communication medium to controller device 10, which may respond as described above to support user interface 36.

Figure 3B:
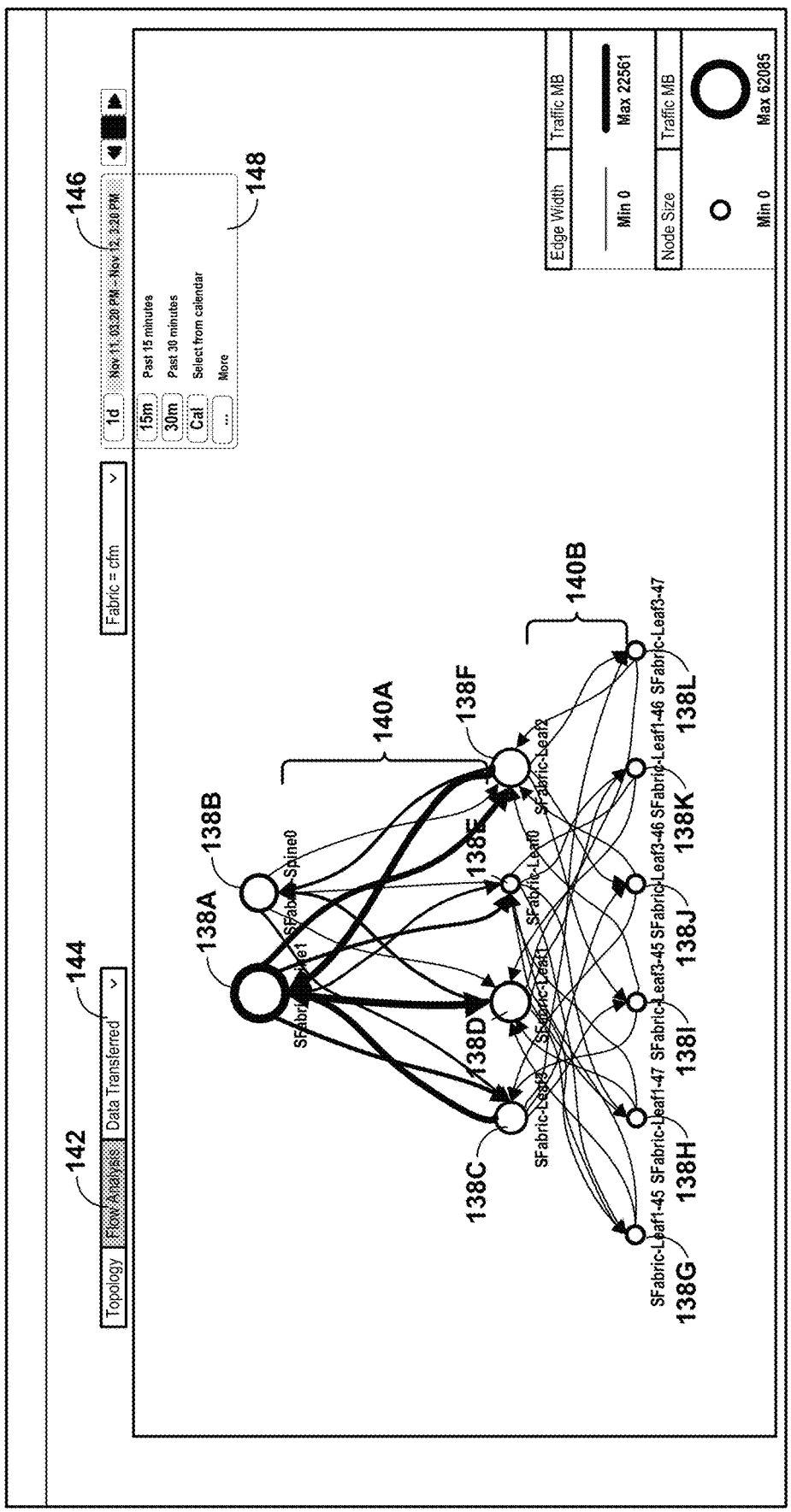

FIGS. 3A-3F are diagrams illustrating examples of the single graphical user interface that provides a topology-based view of a network in accordance with various aspects of the techniques described in this disclosure. As shown in the example of FIG. 3A, user interface 136A may represent an example of user interface 36 (FIG. 2) that presents a single graphical user interface in which a network topology is depicted as nodes 138A-138L ("nodes 138") and edges 140A and 140B ("edges 140").

Each of nodes 138 represents a network device (e.g., one of elements 14) that form a topology (which is fabric 2 in the examples of FIGS. 1 and 3A). Each edge 140 represents an interconnection between two respective elements 14, where elements 14 are fully connected to each other element 14 (in a different layer) to form fabric 2. In the example of FIG. 3A, administrator 12 has selected the "flow analysis" view 142 to conceptualize fabric 2 along with operational data 39A representative of network flows.

As shown in the bottom right of user interface 136A, a thickness of each edge 140 may denote network flow data transferred between the one or more pairs of nodes 138, where administrator 12 may select how operational data 39A is applied via selector 144 (with the selection currently being "data transferred"). A size, as also denoted in the lower right of user interface 136A, of each node 138 may denote an amount or extend of network data by each node 138. Administrator 12 may interface with user interface 136A to quickly identify network flows and relative importance of each node 138 in terms of data transferred.

As further shown in the example of FIG. 3A, user interface 136A may include a text entry box 146 that facilitates natural language input to user interface 136A. Administrator 12 may interface with text entry box 146 to input natural language text identifying a time frame or other aspect by which to restrict operational data 39A, such as source address, destination address, type of operational data 39A, etc. NPL 37 of user interface module 38 may then process the natural language text input to identify intents, which are passed to analysis module 30 in order to retrieve operational data 39A consistent with the intents (e.g., over a given time frame, for a particular flow as identified by destination and/or source, and/or of a particular type).

Referring next to the example of FIG. 3B, user interface 136B represents another example of user interface 36, where administrator 12 has interacted with natural language text box 146 to enter natural language text identifying a time frame of "Nov 11, 03:20-Nov. 12, 3:20 PM," which is one day's ("1 d") worth of operational data 39A. NPL 37 may process this natural language text, providing an intent to analysis module 30. The intent, in this example, may formalize the natural language text according to a consistent format, such as 11/11/2021 (15:20) and 11/12/2021 (15:20), possibly converting times to a standard time zone (Greenwich Mean Time— GMT).

Analysis unit 30 may invoke backend API 28 using the intent to obtain operational data 39A over the normalized (to the consistent format) time frame. Analysis unit 30 may aggregate operational data 39A to reflect data transferred per each node 138 and edge 140, providing aggregated operational data 39A' to user interface module 38. Responsive to receiving aggregated operational data 39A', user interface module 38 may update user interface 136B to reflect aggregated operational data 39A' over the intended time frame entered by administrator 12, outputting user interface 136B for display to administrator 12.

As further shown in the example of FIG. 3B, user interface 146 may detect that administrator 12 has entered a time frame and generate a suggestion box 148 that provides one or more suggested time frames (e.g., 15 m— Past 15 minutes, 30 m— Past 30 minutes, Cal—Select from calendar, and . . . — More), where providing such suggestions may be referred to as "autocomplete." Offering potential alternative time frames may enable administrator 12 to identify possible other time frames that may be of interest in troubleshooting or otherwise understanding operation of fabric 2.

Figure 3C:
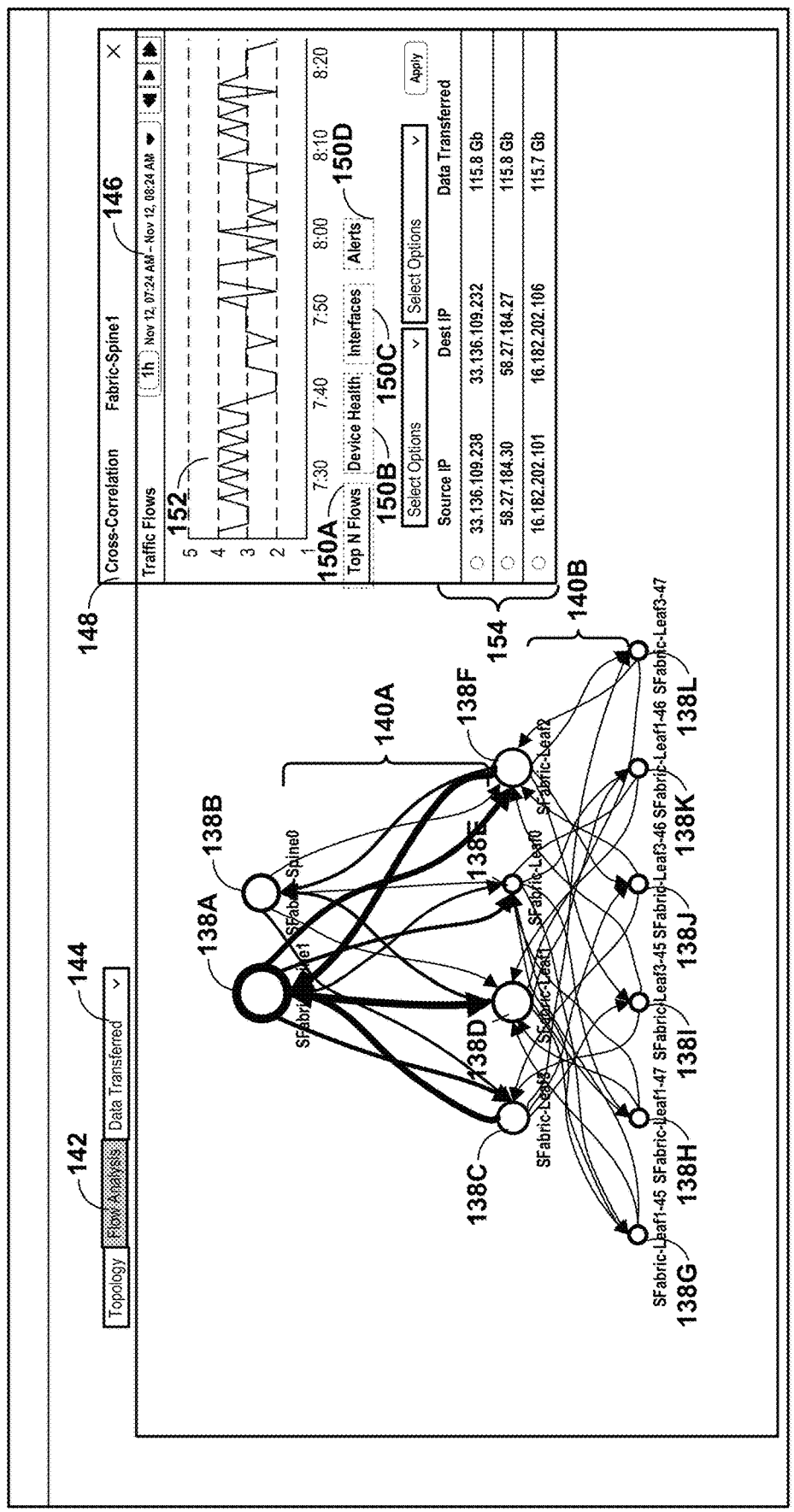

In the example of FIG. 3C, a user interface 136C is shown that may represent another example of user interface 36. User interface 136C presents a cross-correlation view of fabric 2 providing a single graphical user interface by which administrator 12 may select a top N flows input 150A, a device health input 150B, an interfaces input 150C, and alerts input 150D (which may be collectively referred to as "inputs 150"), which may represent different types of operational data 39A or aggregated/adapted operational data 39A'.

In this example, administrator 12 has interacted with natural language text box 146 to specify a 1 hour time frame ("1 h") starting at Nov. 12, 07:24 AM and running through Nov. 12, 08:24 AM. Responsive to entering this time frame (in natural language text), user interface 136C may present cross-correlation frame 148 that includes inputs 150A-150D for selecting various different types of operational data 39A and/or aggregated/adapted operational data 39A'. Currently, as denoted by the line under top N flows 150A, administrator 12 has selected to view the top N flows for fabric 2.

For the top N flows input 150A, cross-correlation frame 148 includes a graph 152 of traffic flows (which is another way to refer to network flows) for the selected time frame along with a list 154 of network flows. Each item in list 154 may include a source IP address, a destination IP address, and an amount of data transferred via the network flows established between the source IP address and the destination IP address. Administrator 12 may interact with either the graphical representation of the topology, e.g., one or more nodes 138 and edges 140, or list 154 to select one or more network flows.

Figure 3D:
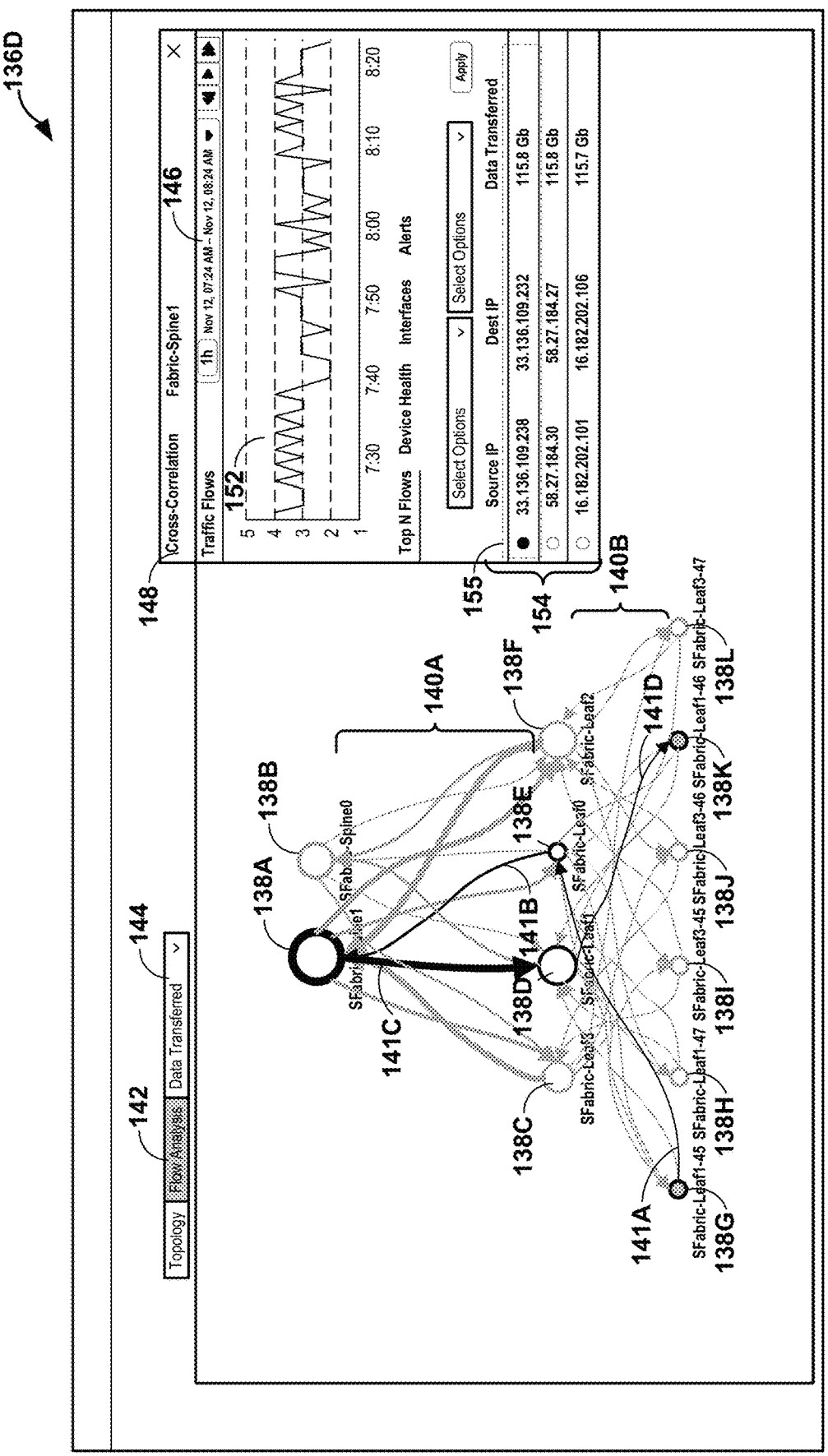

In the example of FIG. 3D, administrator 12 has selected item 155 in list 154, which identifies a network flow from source IP address 33.136.109.238 to destination IP address 33.136.109.232 over which 115.8 gigabits (Gb) have been transferred. Responsive to selecting item 155, user interface 136C transitions to user interface 136D, which is yet another example of user interface 36. User interface 136D has deemphasized all nodes 138 and edges 140 that are not participating in support of the network flow defined in item 155. User interface 136D has highlighted all nodes 138 and edges 140 that are participating in support of the network flow defined in item 155.

As shown in the example of FIG. 3D, user interface 136D has highlighted node 138G, edge 141A, node 138E, edge 141B, node 138A, edge 141C, node 138D, edge 141D, and node 138K. Nodes 138G and 138K are further highlighted as the source and destination (respectively) by the cross-hatch fill, while nodes 138E, 138A, and 138D support forwarding of network traffic in support of the network flow between nodes 138G and 138K identified by item 155 of list 154. In this manner, user interface 136D may enable administrators to visually identify how fabric 2 supports various network flows to facilitate troubleshooting of fabric 2 or better understanding of how fabric 2 is configured.

In other words, user interface 136D may present network flow data (which is a type of operational data 39A) graphically by adapting individual nodes 138 and edges 140. Moreover, user interface 136D may enable selection of individual network flows, and responsive to receiving the selection of the individual network flow (e.g., by selecting item 155) user interface 136D may update the graphical representation of fabric 2 to highlight nodes 138G, 138E, 138A, 138D, and 138K as well as edges 141A-141D. Moreover, user interface 136D may highlight nodes 138G and 138K to denote that these nodes 138G and 138K are the source and destination (e.g., using the above noted cross-hatch fill).

Figure 3E:
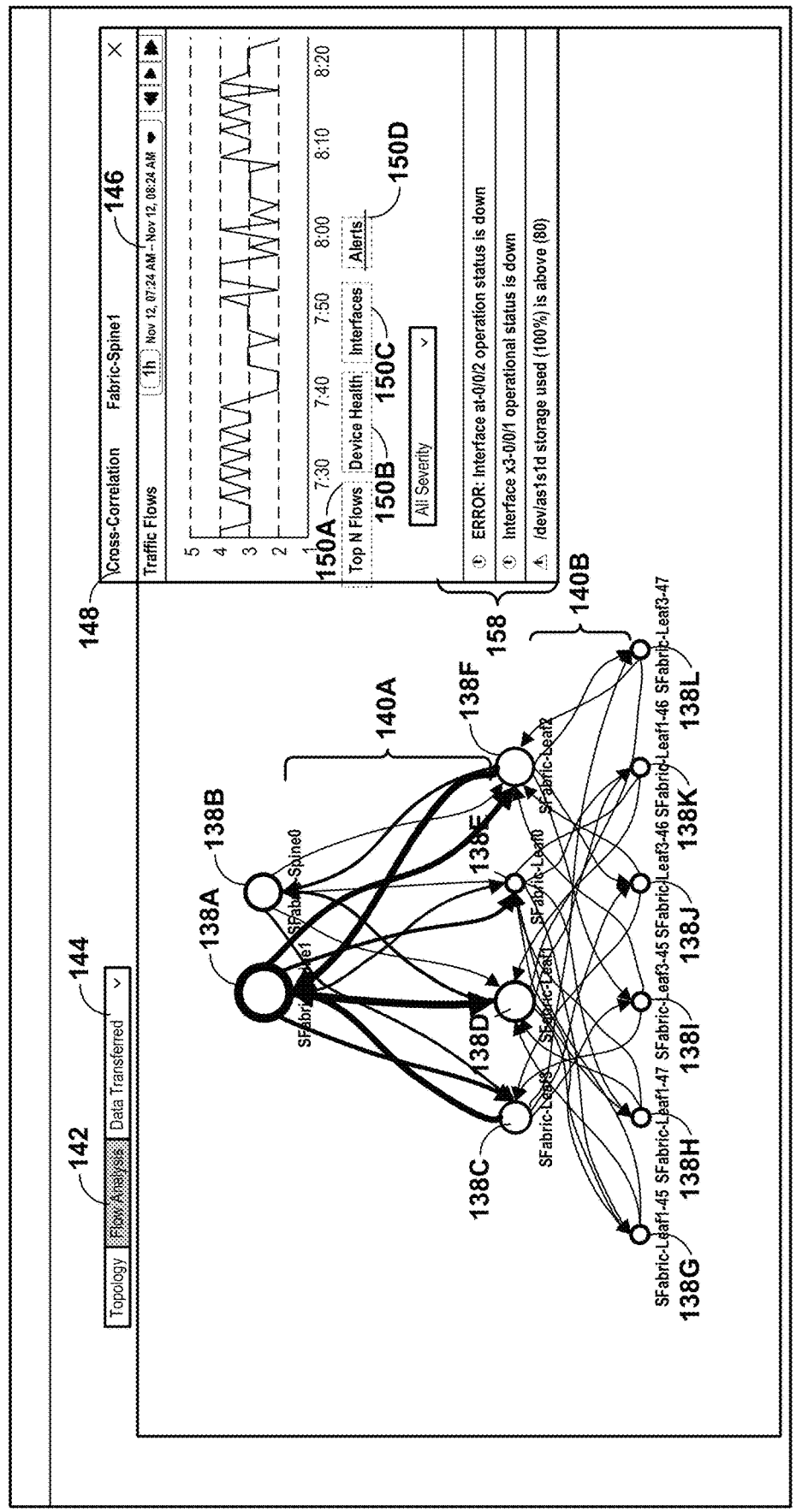

Referring next to the example of FIG. 3E, user interface 136E may represent another example of user interface 36 in which administrator 12 has selected alerts input 150D. Responsive to receiving the selection of alerts input 150D, user interface 136E may update cross-correlation frame to list 158 that includes items representative of alerts that occurred over the time frame of Nov. 12, 07:24 AM-Nov. 12, 08:24 AM. List 158 may include items representative of alerts and/or warnings. In this respect, user interfaces 136A-136E may represent a single graphical user interface that enables cross correlation between various types of operational data 39 over a time frame or other criteria (e.g., a destination, a source, a type of network, etc.).

Figure 3F:
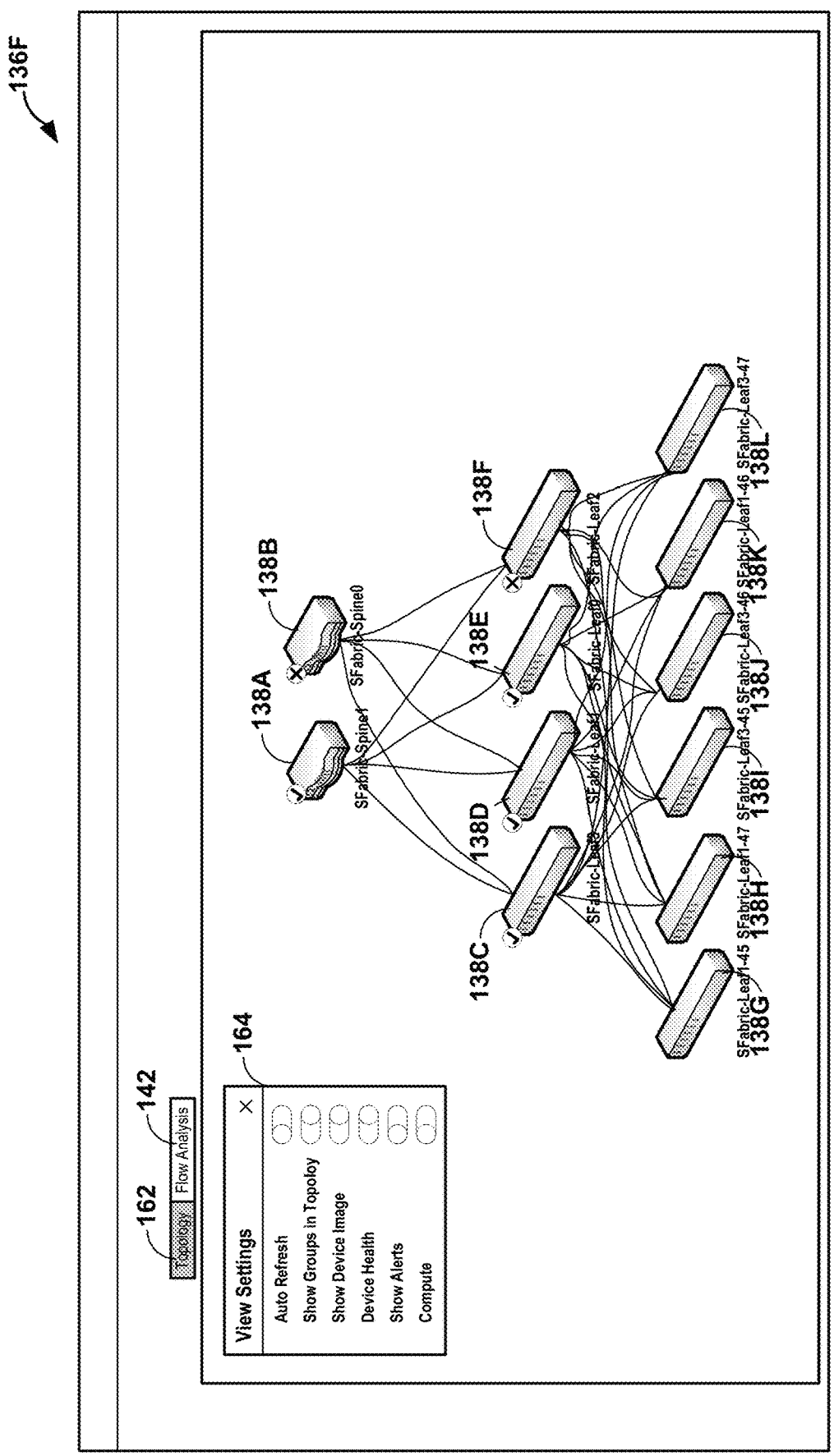

In the example of FIG. 3F, user interface 136F represents another example of user interface 36, which transitioned from the flow analysis view (shown in user interfaces 136A-136E) to a topology view via selection of topology input 160. User interface 136F may present a settings frame 164 that enables administrator 12 to select different settings, such as auto refresh, show groups in topology, show device image, device health, show alerts, compute, etc. In the example of FIG. 3F, administrator 12 has selected to disable (as denoted by a corresponding toggle being to the left) auto refresh, show alerts, and compute, while enabling (as denoted by a corresponding toggle being to the right) show groups in topology, show device image (which may reflect a type of device, such as routers and switches), and device health.

Enabling the device image setting may result in user interface 136F changing the graphical depiction of nodes 138 to reflect the underlying device and/or device type, presenting an image of the underlying device (where nodes 138A and 138B are shown as routers, while nodes 138C-138L are shown as switches). Responsive to enabling the device health settings, user interface 136F may apply a badge with respect to one or more nodes 138 with a device health status (a checkmark indicating the underlying device is operational, and an "X" denoting that the underlying device is non-operational in at least some aspect). As a result of displaying device health with respect to the topology, user interface 136F may enable administrator 12 to quickly identify device health status in the context of the fabric to perform troubleshooting or other operations without having to switch between multiple different user interfaces.

Figure 4A:
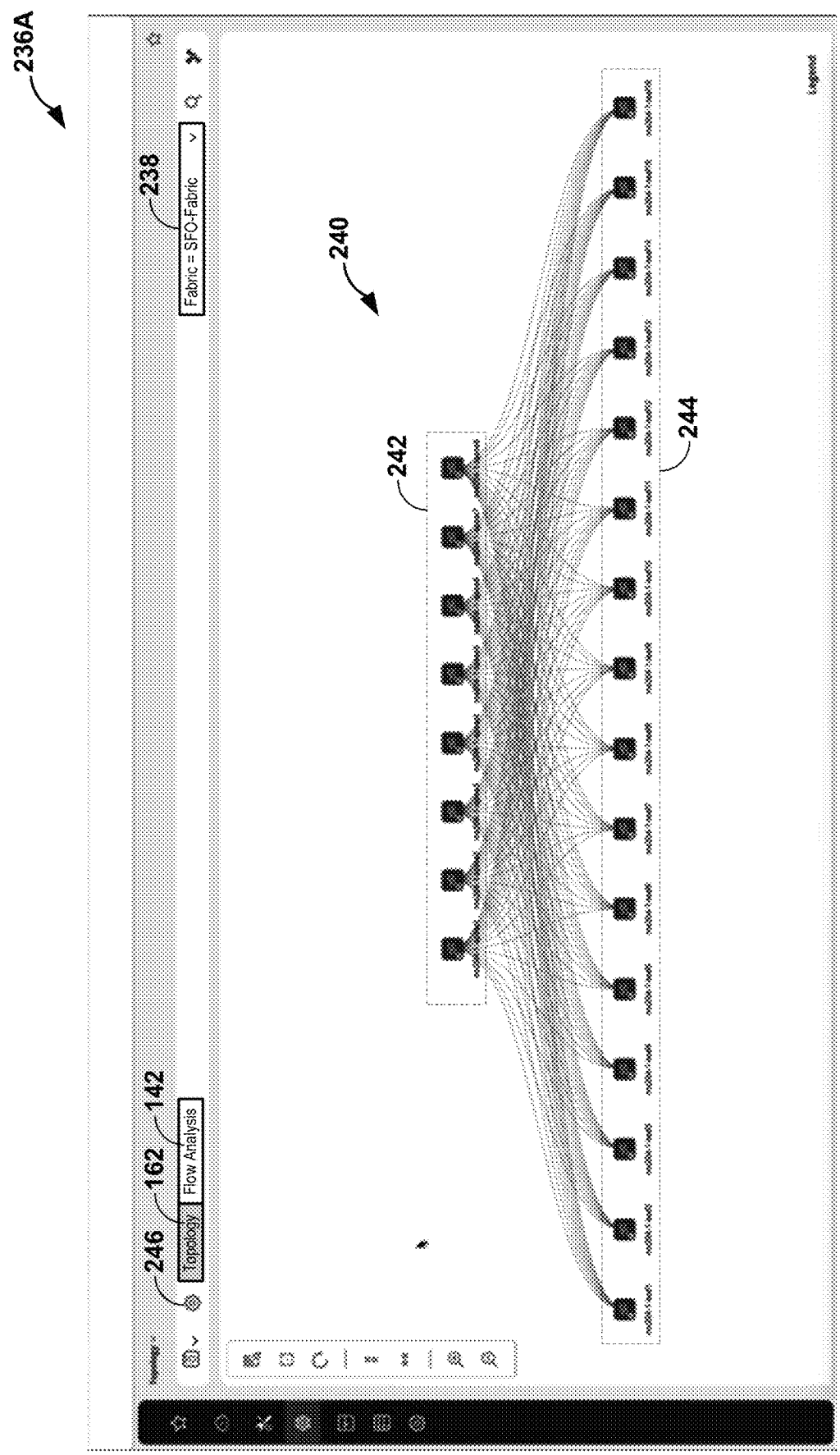
FIGS. 4A-4C are diagrams illustrating examples of the graphical user interface that provides a topology segmented views of a network in accordance with various aspects of the techniques described in this disclosure.
Figure 4B:
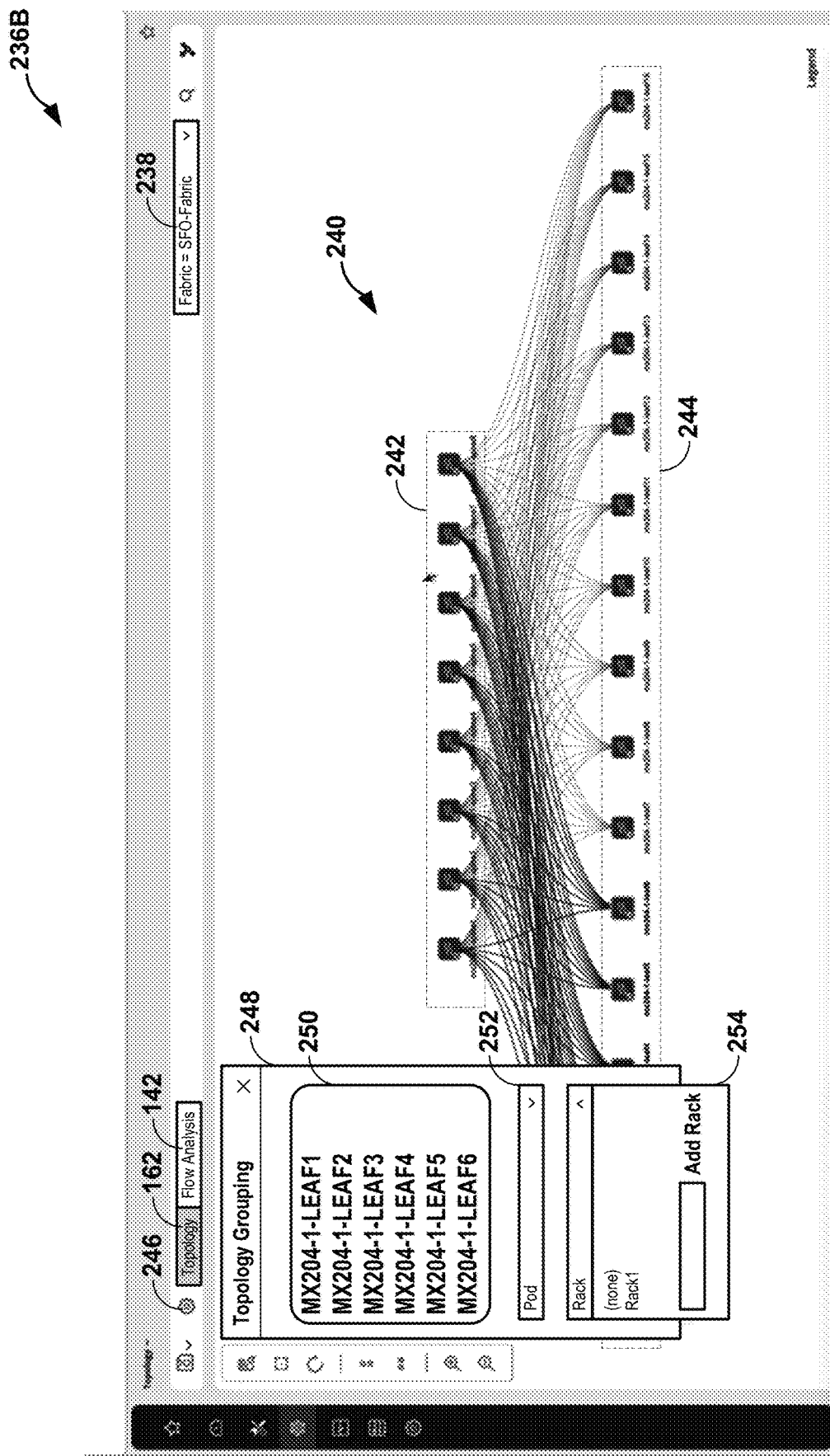
Figure 4C:
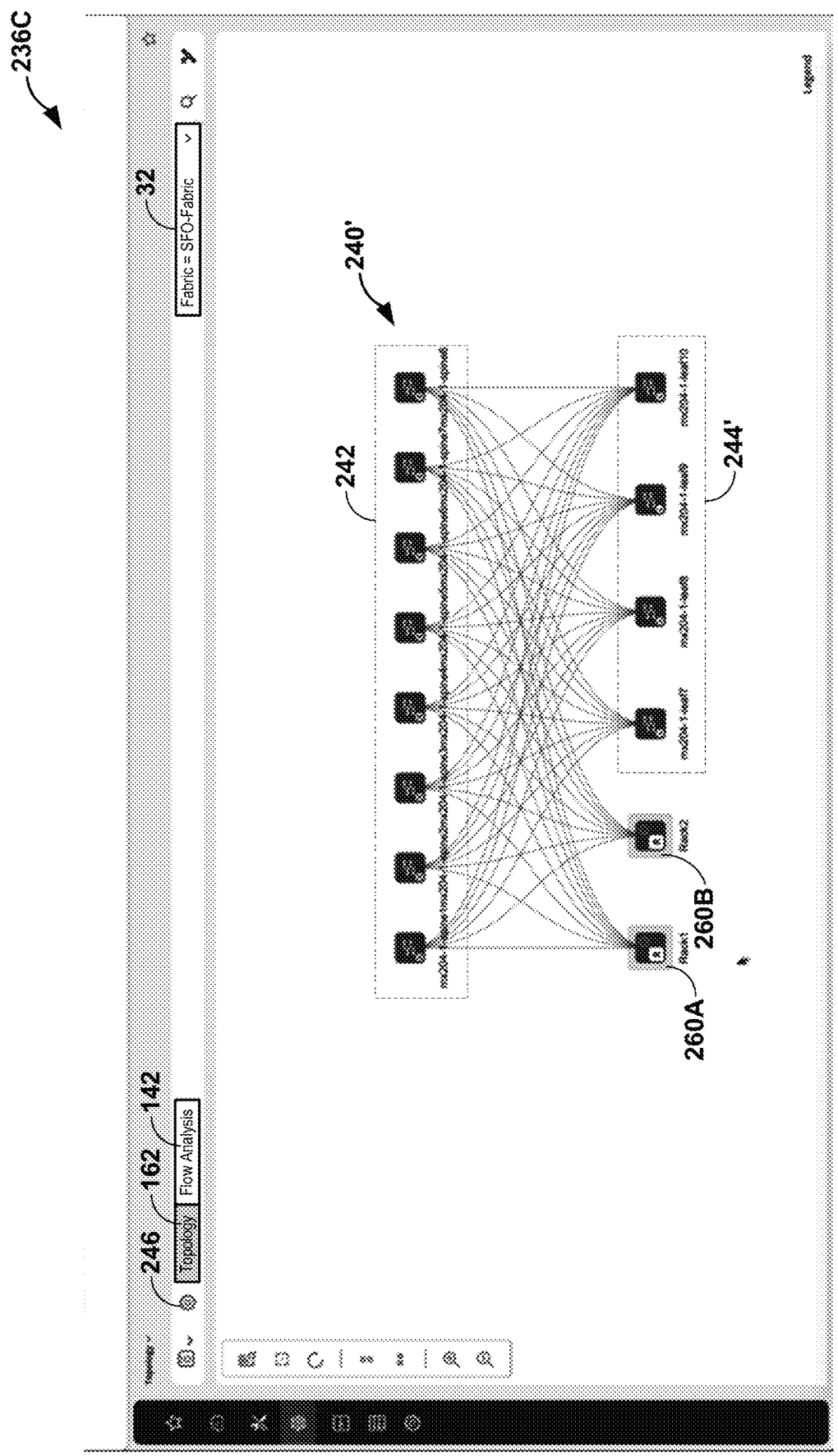

FIGS. 4A-4C are diagrams illustrating examples of the graphical user interface that provides a topology segmented views of a network in accordance with various aspects of the techniques described in this disclosure. In the example of FIG. 4A, user interface 236A may represent another example of user interface 36, and includes an input selection box 238 by which administrator 12 may select a network topology, such as fabric 2 (which is assumed to be named "SFO-Fabric" for purposes of illustration). User interface 236A may pass the input "SFO-Fabric" to user interface module 38, which invokes analysis unit 30 to retrieve configuration data 29A for fabric 2 along with operational data 39A for fabric 2 (both via backend API 28).

Analysis unit 30 may construct a graph data structure (or other data structure) representative of fabric 2 as described above, passing the graph data structure to user interface module 38. User interface module 38 may then present a graphical representation of the graph data structure as topology 240, which is assumed to be representative of fabric 2. Topology 240 includes representations of spine elements 242 and leaf elements 244 interconnected by edges representative of physical connections between spine elements 242 and leaf elements 244.

User interface 236A may also include a settings icon 246 by which administrator 12 may configure topology 240, including adding tags and/or groups. Administrator 12 is assumed to interface with settings icon 246, whereupon user interface 236A passes the input representative of selecting settings icon 246 to user interface module 38, with which the user may interact to reveal a topology grouping pop-up box. User interface module 38 may then update user interface 236A to include the topology grouping pop-up box, as shown in the example of FIG. 4B.

In the example of FIG. 4B, user interface 236B may again represent an example of user interface 36, where user interface 236B has revealed a topology grouping pop-up box 248. Topology grouping pop-up box 248 may specify an interactive list 250 of elements 50, which administrator 12 may select in order to group, e.g., as a pod via a pod dropdown 252 (which may represent a logical grouping) and/or as a rack via a rack dropdown 254 (which may represent a physical grouping, where rack refers to a network rack in which all elements providing fabric 2 that are in the same network rack will be grouped).

As shown in the example of FIG. 4B, rack dropdown 254 has been selected and enables selection of "Rack1" and further provides the ability to add a rack via selection of elements 14 in list 250, followed by entry of a name for the rack to add. While not shown in the example of FIG. 4B, pod dropdown 252 may be similar if not substantially the same as rack dropdown 254 in that pod dropdown 252 enables selection of an existing pod and provides the ability to assign a pod to items selected in list 250. In this way, user interface 236B may facilitate assigning racks, rows (e.g., a datacenter row), groups, pods, tags or any other logical or physical identifier to elements 14 that provide fabric 2, and thereafter selection of such groups, pods, tags, or other logical or physical identifier assigned to elements 14 that provide fabric 2.

In the example of FIG. 4C, a user interface 236C may represent a further example of user interface 36, where it is assumed that administrator 12 divided items of list 250 into separate rack groups ("Rack1" and "Rack2") via the topology grouping pop-up box 248. User interface 236C may interface with user interface module 38 to assign the rack groups as configuration data 29A associated with each of elements 14 identified in list 250, which is passed back via analysis module 30 and backend API 28 to configuration database 29.

Analysis module 30 may update the graph data structure representative of the network topology 240 to associate each of elements 14 assigned to the "Rack1" group as a single node 260A, aggregating operational data 39A/39A' across elements 14 assigned to the "Rack1" group. Analysis module 30 may also update the graph data structure representative of the network topology 240 to associate each of elements 14 assigned to the "Rack2" group as a single node 260B, aggregating operational data 39A/39A' across elements 14 assigned to the "Rack2" group. Analysis module 30 may leave any nodes of the graph data structure that were not assigned to a group such that, in this example, spine nodes 242 remain unchanged but leaf nodes 244 are modified (due to the grouping) resulting in remaining leaf nodes 244'. Analysis module 30 may provide this updated graph data structure representative of the updated topology (which may be denoted as topology 240') to user interface module 38.

User interface module 38 may then generate graphical user interface 236C to include topology 240'. Responsive to generating graphical user interface 236C to include topology 240', user interface module 236C may output graphical user interface 236C for review by administrator 12.

Figure 5A:
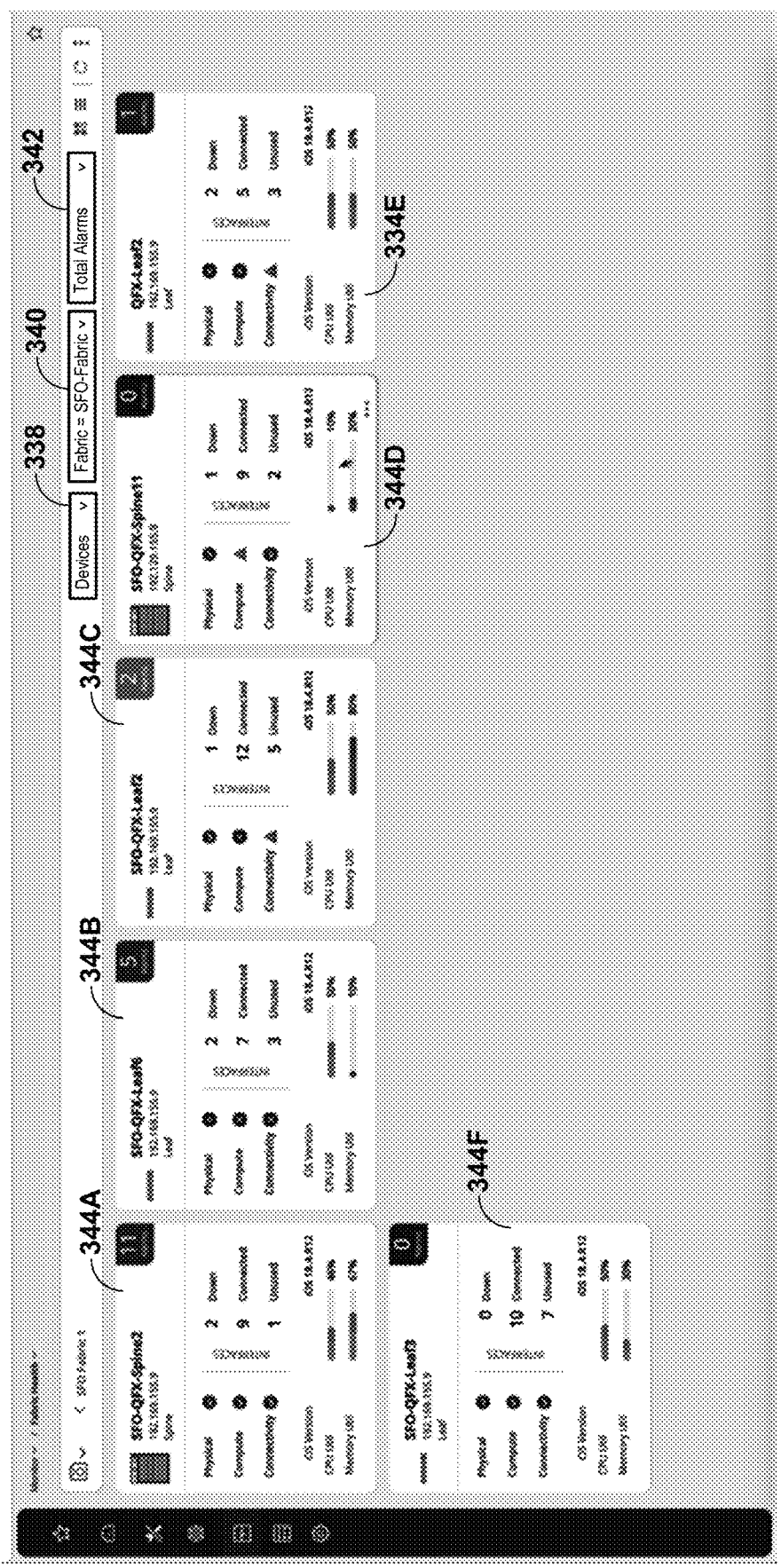
FIGS. 5A and 5B are diagrams illustrating examples of the graphical user interface that provides multi-granular device health views with respect to elements of a network in accordance with various aspects of the techniques described in this disclosure.
Figure 5B:
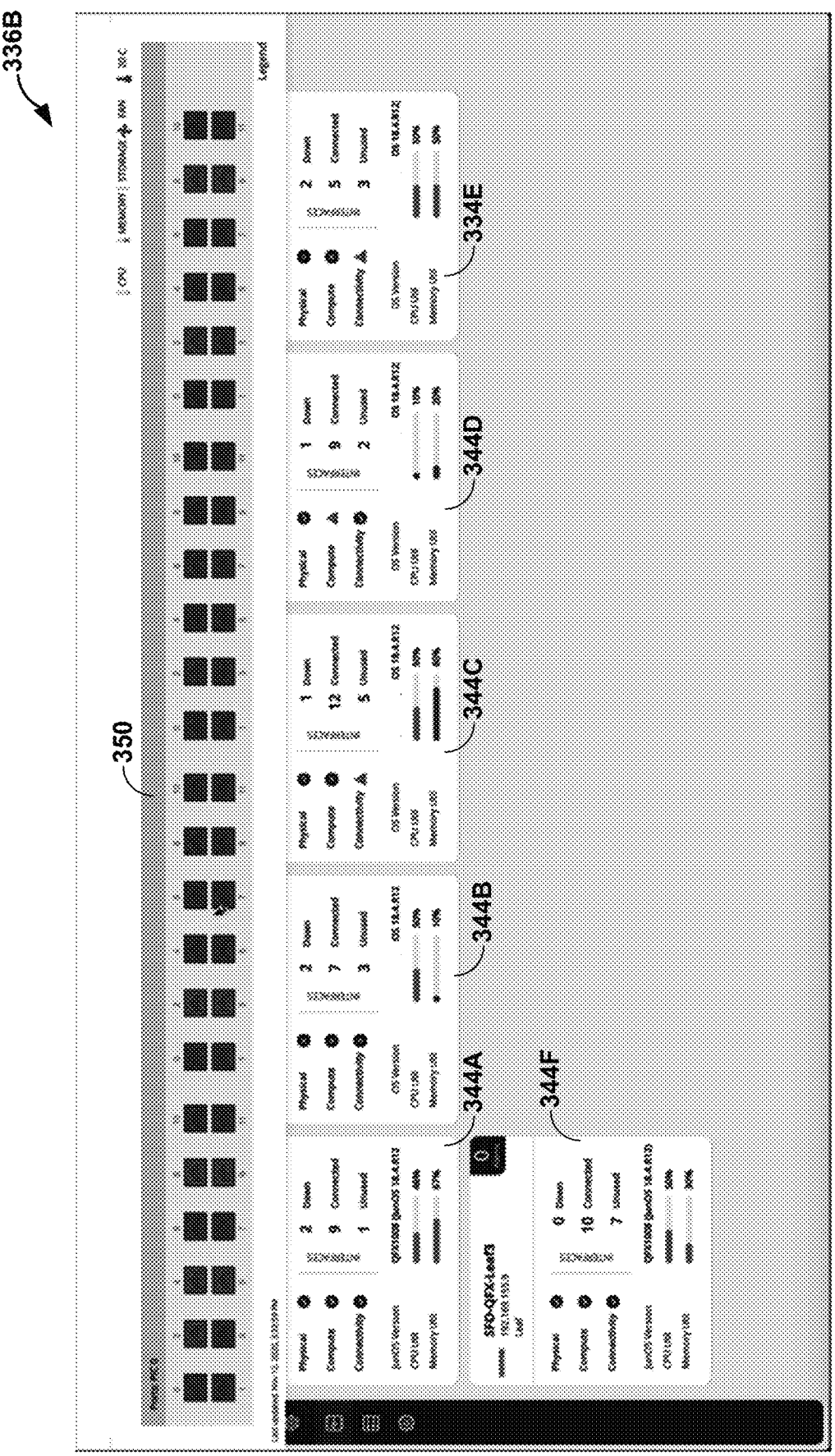

FIGS. 5A and 5B are diagrams illustrating examples of the graphical user interface that provides multi-granular device health views with respect to elements of a network in accordance with various aspects of the techniques described in this disclosure. In the example of FIG. 5A, a graphical user interface 336A represents an example of user interface 36 of FIG. 2 that provides a comprehensive representation of fabric health. Graphical user interface 336A may include a level dropdown 338, a fabric selection dropdown 340, and a sort dropdown 342.

Level dropdown 338 may enable selection of different levels of aggregation, such as a device level in which individual elements 14 of fabric 2 are displayed, a fabric level in which health of overall fabric 2 is displayed, a group level in which elements 14 of fabric 2 may be grouped by way of tags, pods, rows, rack, etc., a port level in which individual ports of interfaces provided by elements 14 of fabric 2 are displayed, etc. In the example of FIG. 5A, the devices level is selected. Fabric selection dropdown 340 may enable selection of different fabrics provided by elements 14, such as fabric 2. Sort dropdown 342 may enable selection of different types of fabric health by which to sort the level selected via level dropdown 338, such as total alarms, central processing unit (CPU) utilization, memory utilization, down interfaces, etc.

As shown in the example of FIG. 5A, a device level has been selected via level dropdown 338, an "SFO-Fabric" has been selected via fabric selection dropdown 340, and device health data 69 for individual elements 14 of fabric 2 (which is assumed to be referred to as "SFO-Fabric") has been sorted by total alarms per sort dropdown 342. As a result, user interface 336A may interface with user interface module 38, passing the various selections provided by way of dropdowns 338, 340, and 342 to user interface module 38.

User interface module 38 may invoke analyze module 30, passing the above noted selections to analyze module 30, which retrieves, based on the selected, operational data 39A via backend API 28. Analyze module 30 may next process (possibly using machine learning models) operational data 39A to generate device health data 69. Analyze module 30 may provide device health data 69 to user interface module 38.

User interface module 38 may, responsive to receiving device health data 69, generate graphical user interface 336A to include cards 344A-344F ("cards 344"). Cards 344 may each provide device health data 69 for each element 14 that provides fabric 2 and are sorted by total alarms (which is shown in the top right). For example, card 344A denotes a particular one of elements 14 as "SFO-QFX-Spine2" along with the IP address of 192.169.155.9 and an assigned role of "Spine" within fabric 2. Card 344A indicates that this particular one of elements has 11 alarms.

In addition, card 344A provides a graphical representation of device health over three categories "Physical," "Compute," and "Connectivity," where a checkmark indicates operational, an "X" denotes inoperational, and a exclamation mark denotes an occurrence of a warning (e.g., operational but nearing conditions that may result in failure as determined for example by way of thresholds). Card 344A also presents a summary of "Interfaces," where 2 interfaces are down (or in other words, inoperational), 9 interfaces are connected, and 1 interface is unused. Card 344A further provides an OS version of "OS 18.4.R12," while also including a graphical representation of CPU utilization ("CPU Util") along side a percentage of 46%, and a graphical representation of memory utilization ("Memory Util") along side a percentage of 67%. Each of cards 344 may provide similar information to card 344A, enabling administrator to quickly identify issues with fabric 2.

Graphical user interface 336A may enable selection of individual aspects of each card 344 to present more information regarding the selected individual aspect. For example, graphical user interface 336A may enable selection of the graphical representation of the "Physical" device health icon to view such "Physical" device health data in more detail. Graphical user interface 336A may, as another example, enable selection of CPU utilization to view device health data 69 associated with CPU utilization (e.g., which may include names of processes executed by the CPU of the particular one of elements 14 represented by card 344A). Likewise, graphical user interface 336A may enable selection of interfaces to view particular interfaces at a port level, which is shown in the example of FIG. 5B.

Referring next to the example of FIG. 5B, a graphical user interface 336B is shown that provides yet another example of user interface 36. Graphical user interface 336B includes an interface overlay 350 that depicts individual ports of the interface. Interface overlay 350 may enable selection of individual ports to view device health data 69 associated with each individual port (e.g., dropped packets, flows processed by individual ports, data transferred, rate of data transfer or in other words, throughput, etc.).

While various graphical elements of the foregoing user interfaces are described, such as pop-up boxes, dropdowns, lists, items, etc., it should be understood that other graphical elements can be used to perform functionality attributed to particular graphical elements above. For example, lists may be implemented as dropdowns, radio buttons, pop-up boxes, and the like. As such, graphical element operations attributed to a particular style of graphical element should be understood as representative of any graphical element, which may include, to provide a few examples, a list, a radio button, a selector, an input button, a dropdown, an item, a text box, a pop-up box, a scrollable box, etc.

Figure 6:
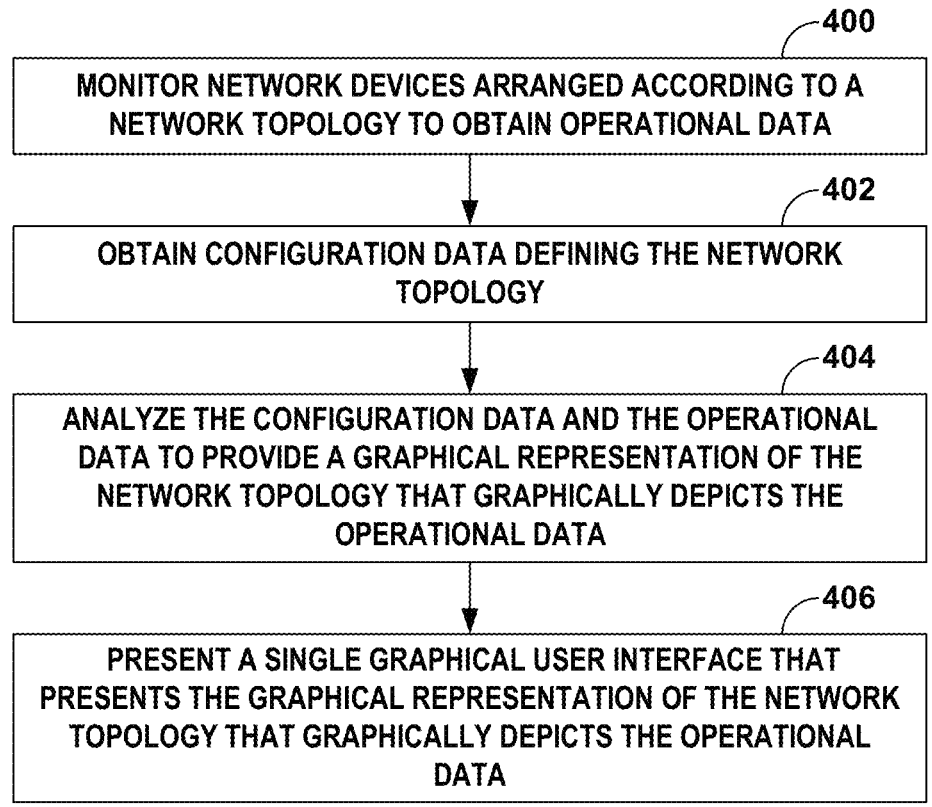
FIGS. 6 and 7 are flowcharts illustrating example operation of the controller device shown in the examples of FIGS. 1 and 2 in performing various aspects of the techniques described in this disclosure.
Figure 7:
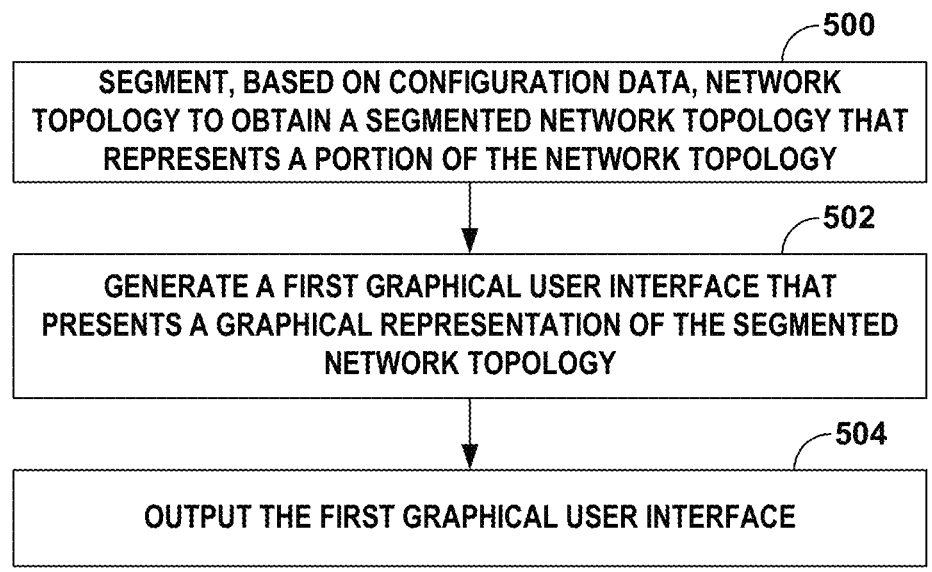

FIGS. 6 and 7 are flowcharts illustrating example operation of the controller device shown in the examples of FIGS. 1 and 2 in performing various aspects of the techniques described in this disclosure. Referring first to the example of FIG. 6, controller device 10 may monitor elements 14 (which may also be referred to, as noted above, as managed devices 14 or network devices 14) arranged according to a topology in order to obtain operational data (400), such as the above noted network flow data, device health data, interface data, and/or alert data.

Controller device 10 may next interface with each of elements 14 via the management interfaces presented by elements 14. Controller device 10 may, in some instances, establish a push framework in which elements 14 push or otherwise provide operational data periodically or in response to some event thereafter without requiring controller device 10 to interface with elements 14 each time operational data becomes available. In other instances or in conjunction with such push instances, controller device 10 may establish a pull framework in which controller device 10 interfaces, possibly periodically or responsive to some event, with each of elements 14 to request operational data each time controller device 10 requires such operational data. Regardless of the framework, controller device 10 may obtain operational data from each of elements 14, storing such operational data to a database or other data store.

Controller device 10 may next obtain configuration data defining fabric 14 (or in other words, the network topology) (402). Controller device 10 may store configuration data locally to a database or other data store or may retrieve such configuration data from elements 14 or from a remote database or other data store. Assuming for purposes of example that configuration data is stored locally, controller device 10 may interface with a configuration database to retrieve the configuration data defining the configuration of elements 14 in support of fabric 2. Although assumed to support a single topology, e.g., fabric 2, one or more, including subsets of, elements 14 may support multiple different topologies in support of the various services offered by the data center across various different end users and/or customers.

Controller device 10 may next apply various algorithms to analyze configuration data and operational data to generate a graphical representation of the network topology that graphically depicts the operational data (404). For example, controller device 10 may arrange elements 14 as nodes in a graph data structure with edges of the graph data structure defining connections (e.g., physical links) between elements 14, where elements 14 and the connections are defined by the configuration data. Controller device 10 may generate a graphical representation of the graph data structure (as discussed in more detail below), assigning different formats to the graphical representation of the nodes and edges of the graph data structure based on the operational data.

Controller device 10 may then generate a single graphical user interface that includes the graphical representation of fabric 2 (e.g., the graph data structure) that graphically depicts the operational data. Controller device 10 may then present the single graphical user interface to administrators 12 (406), which may interact with the single graphical user interface in a number of different way to potentially better understand operation of fabric 2 and thereby perform troubleshooting in a more unified way without having to perform frequent interactions with multiple user interfaces that would otherwise be required to see the multiple different types of operational data.

Referring next to the example of FIG. 7, controller device 10 may obtain configuration data for configuring elements 2 to provide fabric 2. As noted above, controller 10 may obtain such configuration from local or remote data stores, such as databases, as well as from elements 2. Controller device 10 may then segment, based on the configuration data (which may include the above noted tags and/or groups), fabric 2 to obtain a segmented fabric that represents a portion of fabric 2 (where such portion should be understood to be less then the entirety of fabric 2 in terms of having at least one of elements 14 of fabric 2 excluded from the segmented fabric) (500). Controller device 10 may then generate a first graphical user interface that presents a graphical representation of the segmented fabric, and output the first graphical user interface (502, 504).

In addition, controller device 10 may, as noted above, monitor elements 14 configured to provide fabric 2 to obtain operational data, which may include interface metrics, fan temperature, memory usage, protocols, and disk usage. Controller device 10 may analyze the configuration data and the operational data to generate the device health data for each of the network devices at two or more levels of granularity (e.g., a fabric level and a device level). Controller device 10 may generate the device health data to identify a relative health of each of elements 14 with respect to each role assigned to elements 14 in fabric 2. Controller device 10 may next generate a graphical user interface (or update the existing graphical user interface) to present the device health data, outputting the graphical user interface for review by administrator 12.

In this respect, various aspects of the techniques may enable one or more of the following examples.

Example 1A. A method comprising: monitoring, by a controller device, network devices arranged according to a network topology to obtain operational data; obtaining, by the controller device, configuration data defining the network topology; analyzing, by the controller device, configuration data and operational data to generate a graphical representation of the network topology that graphically depicts the operational data; and presenting, by the controller device, a single graphical user interface that includes the graphical representation of the network topology that graphically depicts the operational data.

Example 2A. The method of example 1A, wherein the operational data includes network flow data, and wherein the graphical representation of the network topology depicts each of the network devices as a node in the network topology with an associated size specifying an extent of network flow data transferred by each of the network devices and one or more edges between one or more pairs of the network devices having a thickness representative of network flow data transferred between the one or more pairs of the network devices.

Example 3A. The method of example 2A, wherein the single graphical user interface enables selection of individual network flows, and wherein the method further comprises, responsive to the selection of individual network flows, updating the graphical representation of the network topology to highlight nodes of the network topology and the one or more pairs of the network devices supporting the individual network flows.

Example 4A. The method of any combination of examples 2A and 3A, wherein the single graphical user interface enables each of the one or more edges, wherein the method further comprises, responsive to interaction with a particular edge of the one or more edges, updating the graphical representation of the network topology to provide additional information regarding the particular edge, and wherein the additional information includes an interface of each of the corresponding pair of network devices that supports a physical connection between the corresponding pair of network devices.

Example 5A. The method of any combination of examples 1A-4A, wherein the operational data includes device health data, and wherein the graphical representation of the network topology depicts each of the network devices as a node in the network topology with an associated badge representative of the device health data associated with each of the network devices.

Example 6A. The method of any combination of examples 1A-5A, wherein the single graphical user interface enables selection of a topology view and a flow analysis view, and wherein the method further comprising, responsive to selection of the topology view, updating the graphical representation of the network topology to remove at least some portion of the graphical depiction of the operational data.

Example 7A. The method of example 6A, wherein the at least some portion of the graphical depiction of the operation data includes a graphical depiction of the network flow data.

Example 8A. The method of any combination of examples 1A-7A, wherein the single graphical user interface enables selection of a time range over which the operational data is aggregated prior to the analysis, and wherein analyzing the operational data comprises cross correlating by the time range the operational data to provide the graphical representation of the network topology that graphically depicts the operational data over the time range.

Example 9A. The method of example 8A, wherein the single graphical user interface enables natural language processing for one or more of selection of the time range over which the operational data is aggregated prior to the analysis, identification of operational data by source and destination, and identification of a type of the operational data.

Example 10A. The method of any combination of examples 1A-9A, wherein the operational data includes one or more of network flow data, device health data, interface data, and alert data.

Example 11A. The method of any combination of examples 1A-10A, wherein the network devices arranged according to the network topology reside in a data center and are arranged to support a fabric.

Example 12A. A controller device comprising: one or more processors configured to: monitor network devices arranged according to a network topology to obtain operational data; and obtain configuration data defining the network topology; and a memory configured to store the operational data and the configuration data, wherein the one or more processors are further configured to: analyze the configuration data and the operational data to provide a graphical representation of the network topology that graphically depicts the operational data; and present a single graphical user interface that presents the graphical representation of the network topology that graphically depicts the operational data.

Example 13A. The controller device of example 12A, wherein the operational data includes network flow data, and wherein the graphical representation of the network topology depicts each of the network devices as a node in the network topology with an associated size specifying an extent of network flow data transferred by each of the network devices and one or more edges between one or more pairs of the network devices having a thickness representative of network flow data transferred between the one or more pairs of the network devices.

Example 14A. The controller device of example 13A, wherein the single graphical user interface enables selection of individual network flows, and wherein the one or more processors are further configured to, responsive to the selection of individual network flows, update the graphical representation of the network topology to highlight nodes of the network topology and the one or more pairs of the network devices supporting the individual network flows.

Example 15A. The controller device of any combination of examples 13A and 14A, wherein the single graphical user interface enables each of the one or more edges, wherein the one or more processors are further configured to, responsive to interaction with a particular edge of the one or more edges, update the graphical representation of the network topology to provide additional information regarding the particular edge, and wherein the additional information includes an interface of each of the corresponding pair of network devices that supports a physical connection between the corresponding pair of network devices.

Example 16A. The controller device of any combination of examples 12A-15A, wherein the operational data includes device health data, and wherein the graphical representation of the network topology depicts each of the network devices as a node in the network topology with an associated badge representative of the device health data associated with each of the network devices.

Example 17A. The controller device of any combination of examples 12A-16A, wherein the single graphical user interface enables selection of a topology view and a flow analysis view, and wherein the one or more processors are further configured to, responsive to selection of the topology view, update the graphical representation of the network topology to remove at least some portion of the graphical depiction of the operational data.

Example 18A. The controller device of example 17A, wherein the at least some portion of the graphical depiction of the operation data includes a graphical depiction of the network flow data.

Example 19A. The controller device of any combination of examples 12A-18A, wherein the single graphical user interface enables selection of a time range over which the operational data is aggregated prior to the analysis, and wherein the one or more processors are configured, when analyzing the operational data, to cross correlate by the time range the operational data to provide the graphical representation of the network topology that graphically depicts the operational data over the time range.

Example 20A. A non-transitory computer-readable storage medium having instructions stored thereon that, when executed, cause one or more processors of a controller device to: monitor network devices arranged according to a network topology to obtain operational data; obtain configuration data defining the network topology; analyze configuration data and operational data to provide a graphical representation of the network topology that graphically depicts the operational data; and present a single graphical user interface that presents the graphical representation of the network topology that graphically depicts the operational data.

Example 1B. A method comprising: obtain, by a controller device, configuration data for configuring network devices to provide a network topology; segmenting, by the controller device and based on the configuration data, the network topology to obtain a segmented network topology that represents a portion of the network topology; generating, by the controller device, a first graphical user interface that presents a graphical representation of the segmented network topology; and outputting, by the controller device, the first graphical user interface.

Example 2B. The method of example 1B, further comprising assigning, by the controller device, one or more of a group and a tag to each of the network devices that provide the segmented network topology, wherein segmenting the network topology comprises segmenting, based on the one or more of the group or the tag, the network topology to obtain the segmented network topology.

Example 3B. The method of any combination of examples 1B and 2B, further comprising: generating a second graphical user interface that presents a graphical representation of the network topology; outputting the second graphical user interface; and receiving, via the second graphical user interface, an input that graphically identifies the segmented network topology, wherein segmenting the network topology comprises segmenting, based on the input, the network topology to obtain the segmented network topology.

Example 4B. The method of any combination of examples 1B-3B, further comprising: generating a second graphical user interface that presents a graphical representation of the network topology; outputting the second graphical user interface; analyzing the configuration data to identify the segmented network topology; and presenting, via the second graphical user interface, a suggestion for segmenting the network topology to obtain the segmented network topology.

Example 5B. The method of any combination of examples 1B-4B, further comprising: monitoring the network devices configured to provide the network topology to obtain operational data; analyzing, by the controller device, configuration data and operational data to generate device health data for each of the network devices at two or more levels of granularity; generating, by the controller device, a second graphical user interface that presents the device health data for at least one of the two or more levels of granularity; and outputting the second graphical user interface.

Example 6B. The method of example 5B, wherein the device health data identifies a relative health of each of the network devices with respect to each role assigned to the network devices in the network topology.

Example 7B. The method of any combination of examples 5B and 6B, wherein the two or more levels of granularity include a network topology level and a device level.

Example 8B. The method of any combination of examples 5B-7B, wherein the operational data includes interface metrics, fan temperature, memory usage, protocols, and disk usage.

Example 9B. The method of any combination of examples 5B-8B, wherein analyzing the configuration data and the operational data includes applying machine learning to the configuration data and the operational data to generate the device health data.

Example 10B. The method of any combination of examples 5B-9B, wherein the device health data defines an impact of each of the network devices relative to the network topology.

Example 11B. A controller device comprising: a memory configured to store configuration data for configuring network devices to provide a network topology; and one or more processors configured to: segment, based on the configuration data, the network topology to obtain a segmented network topology that represents a portion of the network topology; generate a first graphical user interface that presents a graphical representation of the segmented network topology; and output the first graphical user interface.

Example 12B. The controller device of example 11B, wherein the one or more processors are further configured to assign one or more of a group and a tag to each of the network devices that provide the segmented network topology, and wherein the one or more processors are configured, when segmenting the network topology, to segment, based on the one or more of the group or the tag, the network topology to obtain the segmented network topology.

Example 13B. The controller device of any combination of examples 11B and 12B, wherein the one or more processors are further configured to: generate a second graphical user interface that presents a graphical representation of the network topology; output the second graphical user interface; and receive, via the second graphical user interface, an input that graphically identifies the segmented network topology, wherein the one or more processors are configured, when segmenting the network topology, to segment, based on the input, the network topology to obtain the segmented network topology.

Example 14B. The controller device of any combination of examples 11B-13B, wherein the one or more processors are further configured to: generate a second graphical user interface that presents a graphical representation of the network topology; output the second graphical user interface; analyze the configuration data to identify the segmented network topology; and present, via the second graphical user interface, a suggestion for segmenting the network topology to obtain the segmented network topology.

Example 15B. The controller device of any combination of examples 11B-14B, wherein the one or more processors are further configured to: monitor the network devices configured to provide the network topology to obtain operational data; analyze, by the controller device, configuration data and operational data to generate device health data for each of the network devices at two or more levels of granularity; generate, by the controller device, a second graphical user interface that presents the device health data for at least one of the two or more levels of granularity; and output the second graphical user interface.

Example 16B. The controller device of example 15B, wherein the device health data identifies a relative health of each of the network devices with respect to each role assigned to the network devices in the network topology.

Example 17B. The controller device of any combination of examples 15B and 16B, wherein the two or more levels of granularity include a network topology level and a device level.

Example 18B. The controller device of any combination of examples 15B-17B, wherein the operational data includes interface metrics, fan temperature, memory usage, protocols, and disk usage.

Example 19B. The controller device of any combination of examples 15B-18B, wherein the one or more processors are configured, when analyzing the configuration data and the operational data, to apply machine learning to the configuration data and the operational data to generate the device health data.

Example 20B. A non-transitory computer-readable storage medium having instructions stored thereon that, when executed, cause one or more processors of a controller device to: obtain configuration data for configuring network devices to provide a network topology; segment, based on the configuration data, the network topology to obtain a segmented network topology that represents a portion of the network topology; generate a first graphical user interface that presents a graphical representation of the segmented network topology; and output the first graphical user interface.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

What is claimed is:

1. A method comprising:
monitoring, by a controller device, network devices arranged according to a network topology to obtain operational data;
obtaining, by the controller device, configuration data defining the network topology;
analyzing, by the controller device, the configuration data and the operational data, including network flow data and device health data, to generate a graphical representation of the network topology that graphically depicts the operational data, wherein the network topology represents at least a segment of a network fabric, wherein the graphical representation of the network topology depicts each of the network devices as a node in the network topology and depicts for a subset of the network devices an associated badge representative of low health rating corresponding to the operational data based on a role assigned to the network devices in at least the segment of the network fabric relative to different network devices of the network topology in at least the segment of the network fabric, and wherein the role for each of the network devices is assigned based on an operational importance in supporting at least the segment of the network fabric relative to the different network devices of the network topology in at least the segment of the network fabric;
presenting, by the controller device, a single graphical user interface that includes the graphical representation of the network topology that graphically depicts the operational data, wherein the single graphical user interface enables selection of individual network flows; and
updating, responsive to selection of an individual network flow of the individual network flows, the graphical representation of the network topology to highlight nodes of the network topology and one or more pairs of the network devices supporting the individual network flow.

2. The method of claim 1,
wherein the graphical representation of the network topology depicts each of the network devices as the node in the network topology with an associated size specifying an extent of the network flow data transferred by each of the network devices and one or more edges between the one or more pairs of the network devices having a thickness representative of the network flow data transferred between the one or more pairs of the network devices.

3. The method of claim 2, wherein the single graphical user interface enables interaction with each of the one or more edges,
wherein the method further comprises, responsive to the interaction with a particular edge of the one or more edges, updating the graphical representation of the network topology to provide additional information regarding the particular edge, and
wherein the additional information includes an interface of each of the corresponding pair of network devices that supports a physical connection between the corresponding pair of network devices.

4. The method of claim 1,
wherein the single graphical user interface enables selection of a topology view and a flow analysis view, and
wherein the method further comprising, responsive to selection of the topology view, updating the graphical representation of the network topology to remove at least some portion of the graphical depiction of the operational data.

5. The method of claim 4, wherein the at least some portion of the graphical depiction of the operation data includes a graphical depiction of the network flow data.

6. The method of claim 1,
wherein the single graphical user interface enables selection of a time range over which the operational data is aggregated prior to the analysis,
wherein analyzing the operational data comprises cross correlating by the time range the operational data to provide the graphical representation of the network topology that graphically depicts the operational data over the time range.

7. The method of claim 6, wherein the single graphical user interface enables natural language processing for one or more of selection of the time range over which the operational data is aggregated prior to the analysis, identification of operational data by source and destination, and identification of a type of the operational data.

8. The method of claim 1, wherein the operational data also includes one or more of interface data and alert data.

9. The method of claim 1, wherein the network devices arranged according to the network topology reside in a data center.

10. A controller device comprising:
one or more processors configured to:
monitor network devices arranged according to a network topology to obtain operational data, wherein the operational data includes network flow data and device health data; and
obtain configuration data defining the network topology; and
a memory configured to store the operational data and the configuration data,
wherein the one or more processors are further configured to:
analyze the configuration data and the operational data, including network flow data and device health data, to provide a graphical representation of the network topology that graphically depicts the operational data, wherein the network topology represents at least a segment of a network fabric, wherein the graphical representation of the network topology depicts each of the network devices as a node in the network topology and depicts for a subset of the network devices an associated badge representative of low health rating corresponding to the operational data based on a role assigned to the network devices in at least the segment of the network fabric relative to different network devices of the network topology in at least the segment of the network fabric, and wherein the role for each of the network devices is assigned based on an operational importance in supporting at least the segment of the network fabric relative to the different network devices of the network topology in at least the segment of the network fabric;
present a single graphical user interface that presents the graphical representation of the network topology that graphically depicts the operational data, wherein the single graphical user interface enables selection of individual network flows; and
updating, responsive to selection of an individual network flow of the individual network flows, the graphical representation of the network topology to highlight nodes of the network topology and one or more pairs of the network devices supporting the individual network flow.

11. The controller device of claim 10, wherein the graphical representation of the network topology depicts each of the network devices as the node in the network topology with an associated size specifying an extent of the network flow data transferred by each of the network devices and one or more edges between the one or more pairs of the network devices having a thickness representative of the network flow data transferred between the one or more pairs of the network devices.

12. The controller device of claim 11, wherein the single graphical user interface enables interaction with each of the one or more edges,
wherein the one or more processors are further configured to, responsive to the interaction with a particular edge of the one or more edges, update the graphical representation of the network topology to provide additional information regarding the particular edge, and
wherein the additional information includes an interface of each of the corresponding pair of network devices that supports a physical connection between the corresponding pair of network devices.

13. The controller device of claim 10,
wherein the single graphical user interface enables selection of a topology view and a flow analysis view, and
wherein the one or more processors are further configured to, responsive to selection of the topology view, update the graphical representation of the network topology to remove at least some portion of the graphical depiction of the operational data.

14. The controller device of claim 13, wherein the at least some portion of the graphical depiction of the operation data includes a graphical depiction of the network flow data.

15. The controller device of claim 10,
wherein the single graphical user interface enables selection of a time range over which the operational data is aggregated prior to the analysis,
wherein the one or more processors are configured, when analyzing the operational data, to cross correlate by the time range the operational data to provide the graphical representation of the network topology that graphically depicts the operational data over the time range.

16. A non-transitory computer-readable storage medium having instructions stored thereon that, when executed, cause one or more processors of a controller device to:
monitor network devices arranged according to a network topology to obtain operational data, wherein the operational data includes network flow data and device health data;
obtain configuration data defining the network topology;
analyze configuration data and operational data to provide a graphical representation of the network topology that graphically depicts the operational data, wherein the network topology represents at least a segment of a network fabric, wherein the graphical representation of the network topology depicts each of the network devices as a node in the network topology and depicts for a subset of the network devices an associated badge representative of low health rating corresponding to the operational data based on a role assigned to the network devices in at least the segment of the network fabric relative to different network devices of the network topology in at least the segment of the network fabric, and wherein the role for each of the network devices is assigned based on an operational importance in supporting at least the segment of the network fabric relative to the different network devices of the network topology in at least the segment of the network fabric;
present a single graphical user interface that presents the graphical representation of the network topology that graphically depicts the operational data, wherein the single graphical user interface enables selection of individual network flows; and
updating, responsive to selection of an individual network flow of the individual network flows, the graphical representation of the network topology to highlight nodes of the network topology and one or more pairs of the network devices supporting the individual network flow.

\* \* \* \* \*